US010703348B2

(12) United States Patent
Okano et al.

(10) Patent No.: US 10,703,348 B2
(45) Date of Patent: Jul. 7, 2020

(54) HYDRAULIC PRESSURE CONTROL DEVICE

(71) Applicants: ADVICS CO., LTD., Kariya-shi, Aichi-ken (JP); TOYOTA JIDOSHA KABUSHIKI KAISHA, Toyota-shi, Aichi-ken (JP)

(72) Inventors: Takahiro Okano, Chiryu (JP); Daisuke Nakata, Seto (JP); Masaki Ninoyu, Obu (JP)

(73) Assignees: ADVICS CO., LTD., Kariya-Shi, Aichi-Ken (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 281 days.

(21) Appl. No.: 15/765,595

(22) PCT Filed: Oct. 21, 2016

(86) PCT No.: PCT/JP2016/081288
§ 371 (c)(1),
(2) Date: Apr. 3, 2018

(87) PCT Pub. No.: WO2017/069243
PCT Pub. Date: Apr. 27, 2017

(65) Prior Publication Data
US 2019/0077385 A1    Mar. 14, 2019

(30) Foreign Application Priority Data

Oct. 23, 2015  (JP) .................................. 2015-209054
Nov. 27, 2015  (JP) .................................. 2015-231376

(51) Int. Cl.
*B60T 8/40*    (2006.01)
*B60T 8/17*    (2006.01)
(Continued)

(52) U.S. Cl.
CPC ............ *B60T 8/4077* (2013.01); *B60T 7/042* (2013.01); *B60T 8/00* (2013.01); *B60T 8/17* (2013.01);
(Continued)

(58) Field of Classification Search
CPC .......... B60T 8/4077; B60T 7/042; B60T 8/00; B60T 8/17; B60T 8/1701; B60T 13/146; B60T 13/662; B60T 13/686; B61H 1/00
(Continued)

(56) References Cited

U.S. PATENT DOCUMENTS 6,220,218 B1 *   4/2001   Saiki ..................... F02D 31/008
                                                     123/325
6,328,674 B1 *  12/2001   Matsue ................. F16D 48/066
                                                     477/155
(Continued)

FOREIGN PATENT DOCUMENTS

JP    H09-011875 A    1/1997
JP    2002-316631 A   10/2002
(Continued)

OTHER PUBLICATIONS

Notice of Allowance and Fee(s) Due issued by the U.S. Patent and Trademark Office in the U.S. Appl. No. 15/763,235, dated Nov. 13, 2019, U.S. Patent and Trademark Office, Alexandria, VA. (13 pages).
(Continued)

*Primary Examiner* — Tuan C To
(74) *Attorney, Agent, or Firm* — Buchanan Ingersoll & Rooney PC

(57) ABSTRACT

The hydraulic pressure control includes a valve portion which adjusts a fluid flowing into or flowing out of a hydraulic pressure chamber, a state judging portion which judges whether or not a state of the hydraulic pressure
(Continued)

chamber is in a state in which the actual pressure is increasing even the holding signal has been inputted to the valve portion and a control portion which executes a specific control which keeps the actual pressure to the hydraulic pressure within the dead zone when the state judging portion judges that the state of the hydraulic pressure chamber is in a state that the actual pressure fluctuates even the holding signal has been inputted to the valve portion.

16 Claims, 8 Drawing Sheets

(51) Int. Cl.
   | | |
   |---|---|
   | *B60T 7/04* | (2006.01) |
   | *B60T 13/14* | (2006.01) |
   | *B60T 13/66* | (2006.01) |
   | *B61H 1/00* | (2006.01) |
   | *B60T 13/68* | (2006.01) |
   | *B60T 8/00* | (2006.01) |

(52) U.S. Cl.
   CPC ......... *B60T 8/1701* (2013.01); *B60T 13/146* (2013.01); *B60T 13/662* (2013.01); *B60T 13/686* (2013.01); *B61H 1/00* (2013.01)

(58) Field of Classification Search
   USPC .......................................................... 701/70
   See application file for complete search history.

(56) References Cited

U.S. PATENT DOCUMENTS

| | | | | |
|---|---|---|---|---|
| 6,947,830 | B1* | 9/2005 | Froloff | F02D 35/023 701/111 |
| 7,234,929 | B2* | 6/2007 | Vasapoli | B29C 45/2701 425/145 |
| 7,765,995 | B2* | 8/2010 | Nakata | F02D 41/2467 123/673 |
| 7,784,883 | B2* | 8/2010 | Nomura | B60T 8/172 303/155 |
| 8,870,301 | B2 | 10/2014 | Ohkubo et al. | |
| 2004/0124701 | A1* | 7/2004 | Nihei | B60T 8/1755 303/163 |
| 2006/0165542 | A1* | 7/2006 | Sakitani | F01C 1/322 418/60 |
| 2007/0090690 | A1 | 4/2007 | Ohkubo | |
| 2007/0252428 | A1 | 11/2007 | Okano et al. | |
| 2008/0234909 | A1* | 9/2008 | Iwasaki | B60T 1/10 701/70 |
| 2013/0207451 | A1 | 8/2013 | Ohkubo et al. | |
| 2015/0102658 | A1 | 4/2015 | Ohkubo et al. | |
| 2015/0175145 | A1 | 6/2015 | Nakata et al. | |
| 2015/0298664 | A1* | 10/2015 | Nimura | B60T 8/36 701/70 |
| 2016/0016572 | A1* | 1/2016 | Higashi | B60T 8/4872 303/10 |
| 2016/0339889 | A1 | 11/2016 | Okano et al. | |
| 2016/0347297 | A1 | 12/2016 | Ninoyu et al. | |
| 2017/0120882 | A1 | 5/2017 | Ninoyu et al. | |
| 2018/0304870 | A1 | 10/2018 | Ninoyu et al. | |
| 2018/0304875 | A1* | 10/2018 | Yamaguchi | B60T 8/34 |
| 2018/0345925 | A1 | 12/2018 | Ninoyu et al. | |

FOREIGN PATENT DOCUMENTS

| | | | | |
|---|---|---|---|---|
| JP | 2007-112293 | A | | 5/2007 |
| JP | 2007-296924 | A | | 11/2007 |
| JP | 2007-326517 | A | | 12/2007 |
| JP | 5125533 | B2 | * | 1/2013 |
| JP | 2013-049292 | A | | 3/2013 |
| JP | 2013-111998 | A | | 6/2013 |
| JP | 2015-120397 | A | | 7/2015 |
| JP | 2015-143060 | A | | 8/2015 |
| JP | 2015-182639 | A | | 10/2015 |
| JP | 2015-182640 | A | | 10/2015 |
| WO | WO-9822717 | A1 | * | 5/1998 ............. F04B 49/08 |
| WO | WO-2012141128 | A1 | * | 10/2012 ............. B60K 23/08 |
| WO | WO 2015/111440 | A1 | | 7/2015 |

OTHER PUBLICATIONS

*International Search Report (PCT/ISA/210) dated Dec. 27, 2016, by the Japanese Patent Office as the International Searching Authority for International Application No. PCT/JP2016/081288.
U.S. Appl. No. 15/763,235.
Gao et al., "Electro-hydraulic Proportional Pressure Control System of Hydraulic Machine", IEEE, (2012, month unknown), pp. 370-373.
Houhua et al., "Active Pressure Boosting based Electro-Hydraulic Braking Control for Electric Vehicle", IEEE, Proceedings of the 35$^{th}$ Chinese Control Conference, (Jul. 27-29, 2016), pp. 8902-8907.
Shu-Liang et al., "Experimental Study and Numerical Simulation of Vibration Control Energy Transducer", IEEE, (2010, month unknown), pp. 1-4.
Yuan et al., "Simulation Study of a Two-Stroke Single Piston Hydraulic Free Piston Engine", IEEE, (2008, month unknown), pp. 1244-1249.
Office Action issued by the U.S. Patent and Trademark Office in the U.S. Appl. No. 15/763,235, dated Jul. 30, 2019, U.S. Patent and Trademark Office, Alexandria, VA. (9 pages).

* cited by examiner

HYDRAULIC PRESSURE CONTROL DEVICE

TECHNICAL FIELD

This invention relates to a hydraulic pressure control device.

BACKGROUND ART

In a brake device for a vehicle, a hydraulic pressure control device is used for a vehicular braking device and executes a control in which the actual hydraulic pressure (actual pressure) approximates the target hydraulic pressure (target pressure) which is, for example, determined in response to the braking operation by a driver of the vehicle. Generally, a dead zone is set in the target pressure. Upon executing a control, the hydraulic pressure control device executes a holding control which keeps the actual pressure, judging that the actual pressure has substantially reached to the target pressure when the actual pressure entered the dead zone. By providing such dead zone in the target pressure, hunting generation in the hydraulic pressure control can be more suppressed than in the case where the target pressure is set to only one point. The hydraulic pressure control in the braking device is, for example, disclosed in a Japanese Patent Publication No. JP2013-111998.

CITATION LIST

Patent Literature

[Patent Literature 1] JP2013/111998 A

SUMMARY OF INVENTION

Technical Problem(s)

However, according to the hydraulic pressure control device as explained above, a pressure increasing or a pressure decreasing phenomenon could possibly occur consecutively, even after the actual pressure has entered the dead zone from outside thereof caused by a hysteresis generated due to a sensor response delay or a structural reason. In this control, even the pressure holding control is executed, the actual pressure comes out of the dead zone and that the control mode of the hydraulic pressure device may be undesirably shifted from the holding control mode to the pressure increasing mode or the pressure decreasing mode. This may give an uncomfortable feeling to the driver of the vehicle due to a shifting of the control mode irrespective of braking operation by the driver. Further, the frequently the control mode changes, which cannot achieve further improvements in durability of the components associated with the control.

The present invention has been made in view of the above circumstances, and an object thereof is to provide a hydraulic pressure control device capable of improving the brake feeling of a driver and improving the durability of parts related to control.

Solution to Problem(s)

The hydraulic pressure control device according to a first aspect of the invention comprising a valve portion which adjusts a fluid flowing into or flowing out of a hydraulic pressure chamber, wherein a target pressure which is a target value of a hydraulic pressure in the hydraulic pressure chamber is set and a dead zone which is a range of the hydraulic pressure between a first hydraulic pressure which is lower than the target pressure and a second hydraulic pressure which is higher than the target pressure is set, wherein a pressure increasing signal or a decreasing signal is outputted to the valve portion to instruct execution of an inflow or an outflow of the fluid with respect to the hydraulic pressure chamber, so that an actual pressure which is an actual value of the hydraulic pressure in the hydraulic pressure chamber approximates the target pressure when the actual pressure is located outside the dead zone and a holding signal is outputted to the valve portion to hold the actual pressure when the actual pressure is located within the dead zone, wherein the valve portion is configured to allow a fluctuation of the actual pressure generated upon execution of the inflow or the outflow of the fluid with respect to the hydraulic pressure chamber for a predetermined time period in response to the pressure increasing signal or the decreasing signal which had been inputted immediately before an inputting of the holding signal, even after the holding signal was inputted, and wherein the hydraulic pressure control device further comprising: a state judging portion which judges whether or not a state of the hydraulic pressure chamber is in a state in which the actual pressure fluctuates even the holding signal has been inputted to the valve portion; and a control portion which executes a specific control which keeps the actual pressure to a hydraulic pressure within the dead zone when the state judging portion judges that the state of the hydraulic pressure chamber is in a state that the actual pressure fluctuates even the holding signal has been inputted to the valve portion.

The hydraulic pressure control device according to a second aspect of the invention is characterized in that in addition to the feature of the first aspect, the state judging portion judges whether or not the state of the hydraulic pressure chamber is in a first state in which the actual pressure is increasing even in the state that the holding signal has been inputted to the valve portion and wherein the control portion includes, as the specific control, a dead zone hydraulic pressure setting portion which sets the second hydraulic pressure to a pressure higher than the second hydraulic pressure when the state of the hydraulic pressure chamber is judged to be in the first state by the state judging portion, when the state of the hydraulic pressure chamber is judged to be in a second state which is a state other than the first state judged by the state judging portion.

The hydraulic pressure control device according to a third aspect of the invention is characterized in that, in the first aspect, the state judging portion, as the specific control, judges whether or not the state of the hydraulic pressure chamber is in a first state in which the actual pressure is increasing even in the state that the holding signal is inputted to the valve portion and wherein the control portion outputs a pressure decreasing signal to the valve portion to let the fluid in the hydraulic pressure chamber flow out when the state judging portion judges that the state of the hydraulic pressure chamber is in the first state.

Effect of Invention

According to the first aspect of the invention, when the actual pressure is a pressure within the dead zone, the actual pressure fluctuates, and the fluctuation is detected to keep the actual pressure to be the pressure within the dead zone by execution of the specific control. Accordingly, an occurrence of phenomenon that the actual pressure comes out of the dead zone even under a situation that the actual pressure is desirably kept, can be suppressed. Thus, generation of repetition of pressure decreasing control and the pressure increasing control due to the actual pressure exiting out of the dead zone, can be suppressed. Thus, the brake feeling given to a driver of the vehicle can be improved to thereby improve the durability of components associated with the control.

According to the second aspect of the invention, under a situation that the state of the hydraulic pressure chamber is in the first state, i.e., the actual pressure is increasing by the pressure increasing and decreasing signal by which the actual pressure approximates the target pressure and even after the actual pressure has entered the dead zone and the holding signal had been outputted, the actual pressure is still increasing, a pressure higher than the second hydraulic pressure in the second state is set as the second hydraulic pressure in such state. By increasing the second hydraulic pressure which is the upper limit value of the dead zone in the first state, the shifting of the actual pressure to the area out of the dead zone caused by the increasing of the actual pressure during the holding control (control according to the holding signal) can be suppressed. In other words, the frequency of mode change can be decreased. By this decrease of frequency of mode change, the brake feeling given to the driver of the vehicle can be improved and accordingly, the durability of the components associated with the control can be improved. Further, in case that the state of the hydraulic pressure chamber is in the third state (state that the actual pressure is decreasing in spite of the inputting of the holding signal to the valve portion), the pressure lower than the first hydraulic pressure in the second state is set as the first hydraulic pressure. Such structure can also achieve the effects of the invention similar to the above.

According to the third aspect of the invention, when the state of the hydraulic pressure chamber is in the first state, a limited control (specific control) that opens the pressure decreasing valve for a predetermined time period is executed, and the actual pressure under the holding control can be quickly shifted to a constant state. In other words, when the target pressure is constant, by execution of the specific control, variation or fluctuation of the actual pressure caused by a hysteresis can be suppressed and repetition of shifting of the actual pressure into or out of the dead zone can be suppressed. Thus, the repetition of the pressure increasing or decreasing control can be suppressed to thereby to improve the durability of at least the pressure decreasing valve and the pressure increasing valve. Further, due to the suppression of fluctuation of the actual pressure, the brake feeling to the driver of the vehicle can be improved. Further, the structure that the specific control that the pressure increasing valve is opened for a predetermined time period when the state of the hydraulic pressure chamber is in the third state can also achieve the similar effect of the invention.

BRIEF EXPLANATION OF ATTACHED DRAWINGS

EMBODIMENTS FOR IMPLEMENTING INVENTION

Figure 1:
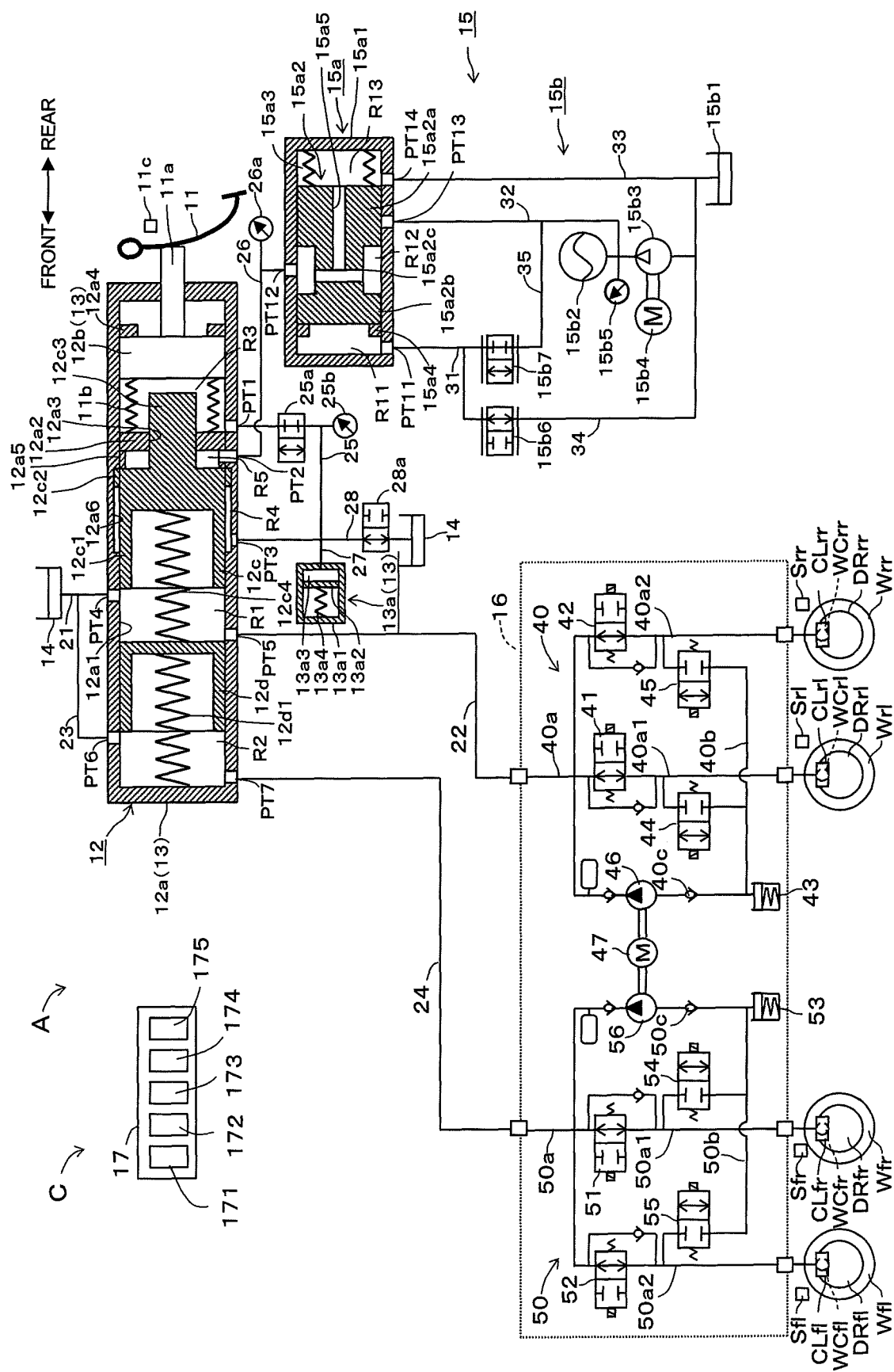
FIG. 1 is an outline schematic view of a hydraulic pressure control device according to a first embodiment of the invention.

The embodiment of the hydraulic pressure control device according to one embodiment of the invention adapted to a vehicle will be explained hereinafter with reference to the attached drawings. The drawings are conceptual diagrams for explanation. The vehicle is equipped with a hydraulic pressure braking force generating device A which applies hydraulic pressure braking force directly to each vehicle wheel Wfl, Wfr, Mrl and Wrr (in some case, collectively referred to as "W") to apply brakes to the vehicle. The hydraulic pressure braking force generating device A includes a brake pedal 11, a master cylinder 12, a stroke simulator portion 13, a reservoir 14, a booster mechanism 15, an actuator 16, a brake ECU 17 and a wheel cylinder WC. The hydraulic pressure braking force generating device A is a brake system. The hydraulic pressure control device C according to the first embodiment includes a booster mechanism 15 (corresponding to "valve portion") and the brake ECU 17 (corresponding to "control portion").

The wheel cylinder WC restricts the rotation of the respective wheels W and is disposed in the caliper CL. The wheel cylinder WC serves as a braking force applying mechanism which applies braking force to the wheels W of the vehicle based on the pressure (brake hydraulic pressure) of the brake fluid (corresponding to "fluid") from the actuator 16. When the brake hydraulic pressure is supplied to the wheel cylinder WC, each piston (not shown) in each wheel cylinder WC pushes a pair of brake pads (not shown) which serves as a friction member and squeezes a disc rotor DR which serves as a rotational member rotating unitary with the wheel W from both sides thereof to thereby restrict the rotation of the disc rotor DR. It is noted here that in this first embodiment, a disc type brake device is used but a drum type brake device may be used. The wheel W indicates any one of right, left front wheels Wfr, Wfl and right, left rear wheels Wrr, Wrl.

The brake pedal 11 corresponds to the brake operating member and is connected to the stroke simulator portion 13 and the master cylinder 12 via an operation rod 11a. A pedal stroke sensor 11c which detects a brake pedal stroke (operation amount; hereinafter referred to also simply as "stroke") by depression of the brake pedal 11 is provided in the vicinity of the brake pedal 11. The brake ECU 17 is connected to this pedal stroke sensor 11c (hereinafter referred to as simply "stroke sensor") and the detected signal (detection result) is outputted to the brake ECU 17.

The master cylinder 12 supplies the actuator 16 with the brake fluid in response to the stroke of the brake pedal 11 and is formed by a cylinder body 12a, an input piston 12b, a first master piston 12c and a second master piston 12d, etc.

A cylinder hole 12a1 is formed in the cylinder body 12a. The cylinder body 12a includes therein a partition wall portion 12a2 which extends inwardly with a shape of flange at the inner peripheral side of the cylinder body 12a. An inner circumferential surface of the partition wall portion 12a2 is provided with a through hole 12a3 at a central portion thereof, penetrating through the partition wall portion 12a2 in front and rearward direction. The cylinder body 12a is provided with a first master piston 12c and a second master piston 12d at an inner peripheral portion thereof at a portion further front side than the partition wall portion 12a2. In the cylinder hole 12a1, the first master piston 12c and the second master piston 12d are disposed so as to be liquid-tight and moveable in the axial direction in a portion forward of the partition wall portion 12a2.

The cylinder hole 12a1 is provided with an input piston 12b at an inner peripheral portion thereof at a portion further rear side than the partition wall portion 12a2. The input piston 12b is liquid-tightly movable in an axial direction in the cylinder hole 12a1. The input piston 12b slidably moves within the cylinder hole 12a1 in response to the operation of the brake pedal 11.

The operating rod 11a which is operable in association with the brake pedal 11 is connected to the input piston 12b. The input piston 12b is biased in a direction where the volume of the first hydraulic pressure chamber R3 expands, i.e., in a rearward direction (right direction as viewed in the drawing) by means of a compression spring 11b. When the brake pedal 11 is depressed, the operating rod 11a advances forward overcoming the biasing force of the compression spring 11b. By this advance movement of the operating rod 11a, the input piston 12b advances in association with the movement of the operating rod 11a. When the depression operation of the brake pedal 11 is released, the input piston 12b retreats by the biasing force of the compression spring 11b and is brought into contact with a restriction projecting portion 12a4 for positioning.

The first master piston 12c includes a pressurizing cylindrical portion 12c1, a flange portion 12c2 and a projecting portion 12c3 in order from the front and these portions are formed integrally as a unit. The pressurizing cylindrical portion 12c1 is formed in a substantially bottomed cylinder shape having an opening at a front portion thereof and a bottom wall at a rear portion thereof. The pressurizing cylindrical portion 12c1 is liquid-tightly movably provided in the inner peripheral surface of the cylinder hole 12a1. A coil spring-shaped biasing member 12c4 is provided in the inner space of the pressurizing cylindrical portion 12c1 between the first master piston 12c and the second master piston 12d. The first master piston 12c is biased in a rear direction by the coil spring 12c4. In other words, the first master piston 12c is biased by the coil spring 12c4 in a rearward direction and is finally brought into contact with a restriction projecting portion 12a5 for positioning. This position is defined to be the initial position (predetermined position) at the time the depression operation of the brake pedal 11 is released.

The flange portion 12c2 is formed to have a greater diameter than the diameter of the pressurizing cylindrical portion 12c1 and is liquid-tightly and slidably disposed on an inner peripheral surface of a large diameter portion 12a6 in the cylinder hole 12a1. The projecting portion 12c3 is formed to have a smaller diameter than the diameter of the pressurizing cylindrical portion 12c1 and is slidably in liquid-tightly provided on the through hole 12a3 of the partition wall portion 12a2. The rear end of the projecting portion 12c3 projects into an inner space of the cylinder hole 12a1, passing through the through hole 12a3 and is separated from the inner peripheral surface of the cylinder hole 12a1. The rear end surface of the projecting portion 12c3 is separated from the bottom wall of the input piston 12b and the separation distance is formed to be variable.

The second master piston 12d is arranged in the cylinder hole 12a1 at a front side relative to the first master piston 12c. The second master piston 12d is formed in a substantially bottomed cylinder shape having an opening at a front portion thereof. A coil spring 12d1 which serves as a biasing member is disposed in the inner space of the second master piston 12d between the second master piston 12d and a closed inner bottom surface of the cylinder body 12a. The second master piston 12d is biased by the coil spring 12d1 in a rearward direction. In other words, the second master piston 12d is biased by the coil spring 12d1 towards a predetermined initial position.

The master cylinder 12 is formed by a first master chamber R1, a second master chamber R2, a first hydraulic pressure chamber R3, a second hydraulic pressure chamber R4 and a servo chamber (corresponding to the hydraulic pressure chamber) R5.

The first master chamber R1 is defined by the cylinder body 12a (the inner peripheral surface of the cylinder hole 12a1), the first master piston 12c (front side of the pressurizing cylindrical portion 12c1) and the second master piston 12d. The first master chamber R1 is connected to the reservoir 14 via the hydraulic passage 21 which is connected to the port PT4. Further, the first master chamber R1 is connected to the hydraulic passage 40a (actuator 16) via the hydraulic passage 22 which is connected to the port PT5.

The second master chamber R2 is defined by the inner peripheral surface of the cylinder hole 12a1 and the front side of the second master piston 12d. The second master chamber R2 is connected to the reservoir 14 via the hydraulic passage 23 which is connected to the port PT6. Further, the second master chamber R2 is connected to the hydraulic passage 50a (actuator 16) via the hydraulic passage 24 which is connected to the port PT7.

The first hydraulic pressure chamber R3 is formed between the partition wall portion 12a2 and the input piston 12b and is defined by the cylinder body 12a (the inner peripheral surface of the cylinder hole 12a1), the partition wall portion 12a2, the projecting portion 12c3 of the first master piston 12c and the input piston 12b. The second hydraulic pressure chamber R4 is formed at the side of the pressurizing cylindrical portion 12c1 of the first master piston 12c and is defined by the large diameter portion 12a6 of the cylinder body 12a, the pressurizing cylindrical portion 12c1 and the flange portion 12c2. The first hydraulic pressure chamber R3 is connected to the second hydraulic pressure chamber R4 via the hydraulic passage 25 which is connected to the port PT1 and the port PT3.

The servo chamber R5 is formed between the partition wall portion 12a2 and the pressurizing cylindrical portion 12c1 of the first master piston 12c and is defined by the cylinder body 12a (the inner peripheral surface of the cylinder hole 12a1), the partition wall portion 12a2, the projecting portion 12c3 of the first master piston 12c and the pressurizing cylindrical portion 12c1. The servo chamber R5 is connected to the output chamber R12 via the hydraulic passage 26 which is connected to the port PT2.

The pressure sensor 26a is a sensor that detects the servo pressure which is supplied to the servo chamber R5 and is connected to the hydraulic passage 26. The pressure sensor 26a sends the detection signal (detection result) to the brake ECU 17. The servo pressure detected by the pressure sensor 26a is an actual value of the hydraulic pressure in the servo chamber R5 and hereinafter this pressure is named as the actual servo pressure (corresponding to the "actual hydraulic pressure").

The stroke simulator portion 13 is formed by the cylinder body 12a, the input piston 12b, the first hydraulic pressure chamber R3 and a stroke simulator 13a which is in fluid communication with the first hydraulic pressure chamber R3.

The first hydraulic pressure chamber R3 is in fluid communication with the stroke simulator 13a via the hydraulic passages 25 and 27 which are connected to the port PT1. It is noted that the first hydraulic pressure chamber R3 is in fluid communication with the reservoir 14 via a connection passage (not shown).

The stroke simulator 13a generates a stroke (reaction force) which magnitude depends on the operation state of the brake pedal 11. The stroke simulator 13a is formed by a cylindrical portion 13a1, a piston portion 13a2, a reaction force hydraulic pressure chamber 13a3 and a spring 13a4. The piston portion 13a2 liquid-tightly slidably moves within the cylindrical portion 13a1 in response to the braking operation by the brake pedal 11. The reaction force hydraulic pressure chamber 13a3 is formed between and defined by the cylindrical portion 13a1 and the piston portion 13a2. The reaction force hydraulic pressure chamber 13a3 is in fluid communication with the first hydraulic pressure chamber R3 and the second hydraulic pressure chamber R4 via the hydraulic passages 27 and 25. The spring 13a4 biases the piston portion 13a2 in a direction where the volume of the reaction force hydraulic pressure chamber 13a3 decreases.

It is noted that the first control valve 25a which is a normally closed type electromagnetic valve is disposed in the hydraulic passage 25. The second control valve 28a which is a normally open type electromagnetic valve is disposed in the hydraulic passage 28 which connects the hydraulic passage 25 and the reservoir 14. When the first control valve 25a is in a closed state, the fluid communication between the first and the second hydraulic pressure chambers R3 and R4 is interrupted. This fluid communication interruption keeps the constant separation distance between the input piston 12b and the first master piston 12c to allow the coordinative movement therebetween. Further, when the first control valve 25a is in an open state, the fluid communication between the first hydraulic pressure chamber R3 and the second hydraulic pressure chamber R4 is established. Thus, the volume change of the first and the second hydraulic pressure chambers R3 and R4 caused by the advance or retreat movement of the first master piston 12c can be absorbed by the transfer of the brake fluid.

The pressure sensor 25b is a sensor that detects the reaction force hydraulic pressure in the second hydraulic pressure chamber R4 and the first hydraulic pressure chamber R3 and is connected to the hydraulic passage 25. The pressure sensor 25b is also an operation force sensor for detecting the operation force applied to the brake pedal 11 and has a correlation with the operation amount of the brake pedal 11. The pressure sensor 25b detects the pressure in the second hydraulic pressure chamber R4 when the first control valve 25a is in a closed state and also detects the pressure (or the reaction force hydraulic pressure) in the first hydraulic pressure chamber R3 which is in fluid communication with the second hydraulic pressure chamber R4 when the first control valve 25a is in an open state. The pressure sensor 25b sends the detection signal (detection result) to the brake ECU 17.

The booster mechanism 15 generates a servo pressure in response to the operating amount of the brake pedal 11. The booster mechanism 15 includes a regulator 15a and a pressure supply device 15b.

The regulator 15a is configured to have a cylinder body 15a1 and a spool 15a2 (spool valve) which slides in the cylinder body 15a1. The regulator 15a includes the pilot chamber R11, the output chamber R12 and the hydraulic pressure chamber R13.

The pilot chamber R11 is defined by the cylinder body 15a1 and a front end surface of a second large diameter portion 15a2b of the spool 15a2. The pilot chamber R11 is connected to the pressure decreasing valve 15b6 and the pressure increasing valve 15b7 (hydraulic passage 31) which are connected to the port PT11. A restriction projecting portion 15a4 is provided on the inner peripheral surface of the cylinder body 15a1 to position the spool 15a2 by contacting the second large diameter portion 15a2b with the restriction projecting portion 15a4.

The output chamber R12 is defined by the cylinder body 15a1 and the small diameter portion 15a2c of the spool 15a2, the rear end surface of the second large diameter portion 15a2b and the front end surface of the first large diameter portion 15a2a. The output chamber R12 is connected to the servo chamber R5 of the master cylinder 12 via the hydraulic passage 26 which is connected to the port PT12 and the port PT2. Further, the output chamber R12 is connectible with the accumulator 15b2 via the hydraulic passage 32 which is connected to the port PT13.

The hydraulic pressure chamber R13 is defined by the cylinder body 15a1 and the rear end surface of the first large diameter portion 15a2a of the spool 15a2. The hydraulic pressure chamber R13 is connectible with the reservoir 15b1 via the hydraulic passage 33 which is connected to the port PT14. A spring 15a3, which biases the spool 15a2 in a direction where the volume of the hydraulic pressure chamber R13 increases, is disposed in the hydraulic pressure chamber R13.

The spool 15a2 is formed by the first large diameter portion 15a2a, the second large diameter portion 15a2b and the small diameter portion 15a2c. The first large diameter portion 15a2a and the second large diameter portion 15a2b are structured to be liquid-tightly movable within the cylinder body 15a1. The small diameter portion 15a2c is arranged between the first large diameter portion 15a2a and the second large diameter portion 15a2b and is formed integrally therewith as a unit. The small diameter portion 15a2c is formed to have a diameter smaller than the first large diameter portion 15a2a and the second large diameter portion 15a2b. Further, a communication passage 15a5 which connects the output chamber R12 and the hydraulic pressure chamber R13 is formed in the spool 15a2.

The pressure supply device 15b also serves as a drive portion which drives the spool 15a2. The pressure supply device 15b includes a reservoir 15b1 which is a low pressure source, an accumulator 15b2 which is a high pressure source that accumulates the brake fluid (corresponding to "fluid"), a pump 15b3 which pumps the brake fluid from the reservoir 15b1 into the accumulator 15b2 and an electric motor 15b4 which drives the pump 15b3. The reservoir 15b1 is exposed to the atmospheric pressure and the hydraulic pressure in the reservoir 15b1 is the same level with the atmospheric pressure. The pressure in the low pressure source is lower than the pressure in the high pressure source. The pressure supply device 15b is provided with a pressure sensor 15b5 which detects the pressure of the brake fluid supplied from the accumulator 15b2 and outputs the detected result to the brake ECU 17.

Further, the pressure supply device 15b is provided with a pressure decreasing valve 15b6 and the pressure increasing valve 15b7. The pressure decreasing valve 15b6 is a normally open type electromagnetic valve which opens in a non-energized state. The flow-rate of the pressure decreasing valve 15b6 is controlled by the instructions from the brake ECU 17. One side of the pressure decreasing valve 15b6 is connected to the pilot chamber R11 via the hydraulic passage 31 and the other side thereof is connected to the reservoir 15b1 via the hydraulic passage 34. The pressure increasing valve 15b7 is a normally closed type electromagnetic valve which closes in a non-energized state. The flow-rate of the pressure increasing valve 15b7 is controlled by the instructions from the brake ECU 17. One side of the pressure increasing valve 15b7 is connected to the pilot chamber R11 via the hydraulic passage 31 and the other side thereof is connected to the accumulator 15b2 via the hydraulic passage 35 and the hydraulic passage 32 which is connected to the hydraulic passage 35. The pressure decreasing valve 15b6 adjusts the outflow amount of the fluid from the servo chamber R5 by adjusting the outflow amount of the fluid from the pilot chamber R11. The pressure increasing valve 15b7 adjusts the inflow amount of the fluid to the servo chamber R5 by adjusting the inflow amount of the fluid to the pilot chamber R11.

The operation of the regulator 15a will be explained briefly hereinafter. In the case where the pilot pressure is not supplied to the pilot chamber R11 from the pressure decreasing valve 15b6 and the pressure increasing valve 15b7, the spool 15a2 is positioned at the initial position by means of a biasing force of the spring 15a3 (See FIG. 1). The initial position of the spool 15a2 is determined by the contact of the front end surface of the spool 15a2 with the restriction projecting portion 15a4. This initial position is the position immediately before the rear end surface of the spool 15a2 closes the port PT14.
As explained, when the spool 15a2 is in the initial position, the port PT14 and the port PT12 are in fluid communication with each other through the communication passage 15a5 and at the same time the port PT13 is closed by the spool 15a2.

In the case where the pilot pressure formed by the pressure decreasing valve 15b6 and the pressure increasing valve 15b7 increases in response to the brake pedal 11 operation, the spool 15a2 moves in a rearward direction (right side in FIG. 1), overcoming the biasing force of the spring 15a3. The spool 15a2 moves to the position where the port PT13, which had been closed by the spool 15a2, opens. The port PT14 which had been in the open state, is closed by the spool 15a2. The position of the spool 15a2 under this state is defined to be the "pressure increasing position". At this position, the rear end surface of the second large diameter portion 15a2b of the spool 15a2 receives a force corresponding to the servo pressure (Pressure increasing operation).

By the force balance between the pushing force at the front end surface of the second large diameter portion 15a2b2 of the spool 15a2 and the force corresponding to the servo pressure, the position of the spool 15a2 is fixed. This position of the spool 15a2 is defined to be the "holding position". The port PT13 and the port PT14 are closed by the spool 15a2 at the holding position (Holding operation).

In the case where the pilot pressure formed by the pressure decreasing valve 15b6 and the pressure increasing valve 15b7 decreases in response to the stroke of the brake pedal 11 operation, the spool 15a2 which is in the holding position now moves in a frontward direction by the biasing force of the spring 15a3. Then, the port PT13 which had been in the closed state by the spool 15a2 keeps the closed state. The port PT14 which had been in the closed state is open. The position of the spool 15a2 at this state is defined to be the "pressure decreasing position". Under this state, the port PT14 and the port PT12 are in fluid communication with each other through the communication passage 15a5 (Pressure decreasing operation).

The above explained booster mechanism 15 generates a pilot pressure in response to a stroke of the brake pedal 11 by the pressure decreasing valve 15b6 and the pressure increasing valve 15b7 and generates a servo pressure which responds to the stroke of the brake pedal 11 by the pilot pressure. The generated servo pressure is supplied to the servo chamber R5 of the master cylinder 12 and the master cylinder 12 supplies the wheel cylinder WC with the master pressure generated in response to the stroke of the brake pedal 11. The booster mechanism 15 including the pressure decreasing valve 15b6 and the pressure increasing valve 15b7 form a valve portion which adjusts the inflow or outflow of the brake fluid into or out of the servo chamber R5.

The actuator 16 is a device which adjusts the brake hydraulic pressure to be applied to each wheel cylinder WC and a first conduit system 40 and a second conduit system 50. The first conduit system 40 controls the brake hydraulic pressure to be applied to the left rear wheel MI and the right rear wheel Wrr and the second conduit system 50 controls brake hydraulic pressure applied to the right front wheel Wfr and the left front wheel Wfl. In other words, the conduit system is a front/rear conduit brake system.

The hydraulic pressure supplied from the master cylinder 12 is transmitted to the respective wheel cylinders WCrl, WCrr, WCfr and WCfl through the conduit systems 40 and 50. In the first conduit system, the hydraulic passage 40a is disposed which connects the hydraulic passage 22 and the wheel cylinders WCrl, WCrr and in the second conduit system 50, the hydraulic passage 50a is disposed which connects the hydraulic passage 24 and the wheel cylinders WCfr, WCfl. Through these hydraulic passages 40a and 50a, the hydraulic pressure supplied from the master cylinder 12 is transmitted to the wheel cylinders WCrl, WCrr, WCfr and WCfl.

The hydraulic passages 40a and 50a are branched to two passages, 40a1 and 40a2 and 50a1 and 50a2, respectively. In the branched hydraulic passages 40a1 and 50a1, the first pressure increasing control valves 41 and 51 which control increasing of the brake hydraulic pressure to the wheel cylinders WCrl and WCfr are disposed respectively and in the branched hydraulic passages 40a2 and 50a2, the second pressure increasing valves 42 and 52 which control increasing of the brake hydraulic pressure to the wheel cylinders WCrr and WCfl, are disposed respectively.

These first pressure increasing valves 41, 42 and the second pressure increasing valves 51, 52 are formed by a two-position electromagnetic valve which can control the valve state to the communication state and the interrupted state. The first pressure increasing valves 41, 42 and the second pressure increasing valves 51, 52 are formed by a normally open type valve which controls the valve state such that when the control current to the solenoid coil provided in the first pressure increasing valves 41, 42 and the second pressure increasing valves 51, 52 is zero value (non-energized state), the valve becomes in a fluid communication state and when the control current to the solenoid coil flows (energized state), the valve becomes in a fluid interrupted state.

The passage portions between the first and the second pressure increasing valves 41, 42 and 51, 52 and the wheel cylinders WCrl, WCrr and WCfr, WCfl in the hydraulic passages 40a, 50a are connected to the reservoirs 43, 53 via the hydraulic passage 40b, 50b, as a decreasing hydraulic passage, respectively. The first pressure decreasing control valves 44, 45 and the second pressure decreasing control valves 54, 55 which are formed by a two-position electromagnetic valve which can control the valve state to the communication state and the interrupted state, are disposed in the hydraulic passages 40b, 50b, respectively. The first pressure decreasing valves 44, 45 and the second pressure decreasing valves 54, 55 are formed by a normally closed type valve which controls the valve state such that when the control current to the solenoid coil provided in the first pressure decreasing valves 44, 45 and the second pressure decreasing valves 54, 55 is zero value (non-energized state), the valve becomes in a fluid interrupted state and when the control current to the solenoid coil flows (energized state), the valve becomes in a fluid communication state.

The hydraulic passages 40c and 50c, which are the return hydraulic passages, are provided between the reservoirs 43, 53 and the hydraulic passages 40a and 50a which is the main hydraulic passages, and in the return hydraulic passages 40c and 50c, the pumps 46 and 56 are disposed which are driven by the motor 47 which suctions or discharges the brake fluid from the reservoirs 43, 53 towards the master cylinder 12 side or towards the wheel cylinders WCrl, WCrr and WCfr, WCfl side.

The pumps 46, 56 suctions the brake fluid from the reservoirs 43, 53 and discharges the same to the hydraulic passages 40a, 50a thereby to supply the wheel cylinder WCrl, WCrr and WCfr, WCfl side with the brake fluid.

The brake ECU 17 is structured such that the detection signals from the wheel speed sensors Sfl, Srr, Sfr and Srl which are provided at the respective vehicle wheels Wfl, Wrr, Wfr and Ml are inputted thereto. The brake ECU 17 calculates the wheel speed of the respective wheels, a presumed vehicle speed and the slip ratio, etc., based on the detection signals from the wheel speed sensors Sfl, Srr, Sfr and Srl. The brake ECU 17 executes anti-skid control (ABS Control) based on the calculation result.

Various controls using the actuator 16 are executed at the brake ECU 17. For example, the brake ECU 17 outputs the control current that controls the various control valves 41, 42, 44, 45, 51, 52, 54 and 55 and the motor 47 which drives pumps provided in the actuator 16 to control the hydraulic pressure circuit in the actuator 16 to thereby independently control the respective wheel cylinder pressure transmitted to the wheel cylinders WCrl, WCrr, WCfr and WCfl. For example, the brake ECU 17 executes the anti-skid control which prevents the wheels from locking by executing pressure decreasing, pressure increasing and holding operations when the vehicle wheels are about to slip in a braking operation or executes a sideslip prevention control which turns the vehicle with an ideal locus by suppressing the sideslip tendency (under steer or over steer tendency) by automatically pressurizing the wheel cylinder pressure of the control subject wheel. The actuator 16 may serve as an ABS system (anti-lock brake system).

The brake ECU 17 includes a control portion 171, a state judging portion 172, a dead zone hydraulic pressure setting portion 173, a total amount calculating portion 174 and a leakage judging portion 175. The control portion 171 obtains the operating amount of the brake pedal 11 (stroke) from the stroke sensor 11c. It is noted that the control portion 171 may obtain the operating force detected from a sensor which detects an operating force (depression force) directly acted on the brake pedal 11, instead of detecting the operating amount of the brake pedal 11.

The control portion 171 calculates the control target hydraulic pressure in response to the obtained stroke. The control target hydraulic pressure according to the first embodiment indicates a target servo pressure which is the target value of the servo pressure. The control portion 171 calculates the target servo pressure for example, from a map indicating a correlative relationship between the stroke and the target servo pressure, prepared in advance. The control target hydraulic pressure may be a control target of the master cylinder pressure. In such case, it is preferable to provide a pressure sensor for detecting the master cylinder pressure in the hydraulic pressure braking force generating device A.

The control portion 171 executes a pressure increasing control which increases the actual servo pressure, a pressure decreasing control which decreases the actual servo pressure and a holding control which holds (keeps) the actual servo pressure so that the actual servo pressure (detected value of the pressure sensor 26a) approximates the target servo pressure. The control portion 171 outputs "pressure decreasing signal" (corresponding to the pressure increasing or decreasing signal) to the pressure decreasing valve 15b6 and the pressure increasing valve 15b7, when the pressure increasing control is executed. The pressure decreasing valve 15b6 is closed by the input of the pressure increasing signal and the pressure increasing valve 15b7 opens by the input of the pressure increasing signal. The pressure increasing valve 15b7 opens such that the fluid amount based on, for example, the difference between the actual servo pressure and the target servo pressure by the input of the pressure increasing signal can be communicable.

The control portion 171 outputs "pressure decreasing signal" (corresponding to the pressure increasing or decreasing signal) to the pressure decreasing valve 15b6 and the pressure increasing valve 15b7, when the pressure decreasing control is executed. The pressure decreasing valve 15b6 opens by the input of the pressure decreasing signal and the pressure increasing valve 15b7 is closed by the input of the pressure decreasing signal. The control portion 171 outputs a "holding signal" to the pressure decreasing valve 15b6 and the pressure increasing valve 15b7, when the holding control is executed. The pressure decreasing valve 15b6 is closed by the input of the holding signal and the pressure increasing valve 15b7 is closed by the input of the holding signal. The control portion 171 controls the pressure decreasing valve 15b6 and the pressure increasing valve 15b7, to open or close so that the hydraulic pressure in the pilot chamber R11 (pilot pressure) and the hydraulic pressure of the hydraulic pressure chamber R13 balance with each other in the holding control.

The target servo pressure is provided with a dead zone. The control portion 171 executes the holding control when the actual servo pressure enters the dead zone, presuming that the actual servo pressure substantially reached to the target servo pressure. The dead zone is set to a hydraulic pressure range from the first hydraulic pressure which is lower than the target servo pressure to the second hydraulic pressure which is higher than the target servo pressure. In other words, the first hydraulic pressure indicates the lower limit value of the dead zone and the second hydraulic pressure indicates the upper limit value of the dead zone. The dead zone is set in advance in response to the target servo pressure by the control portion 171. In the first embodiment, the first hydraulic pressure is set to a value lower than the target servo pressure by a predetermined value (constant value) and the second hydraulic pressure is set to a value higher than the target servo pressure by a predetermined value (constant value), at least while the target servo pressure is judged to be constant.

As explained, the control portion 171 sets the target servo pressure with the dead zone having the hydraulic pressure range from the first hydraulic pressure to the second hydraulic pressure and outputs the pressure increasing or decreasing signal (pressure increasing signal or the pressure decreasing signal) which instructs (allows) the pressure decreasing valve 15b6 and the pressure increasing valve 15b7 to execute an inflow or outflow control of the fluid with respect to the servo chamber so that the actual servo pressure approximates the target pressure, when the actual pressure is located out of the dead zone and further the control portion 171 outputs the holding signal which instructs the pressure decreasing valve 15b6 and the pressure increasing valve 15b7 to hold the actual servo pressure when the actual servo pressure is located within the dead zone.

The control portion 171 also judges whether the target servo pressure is constant or not. In more detail, the control portion 171 compares the current target servo pressure with the target servo pressure at a predetermined time before the current time, per every predetermined time. The control portion 171 judges that the target servo pressure is constant when the difference between the current target servo pressure and the target servo pressure at the predetermined time before the current time is within a predetermined range. When the difference is within the predetermined range, the target servo pressure is judged to be substantially constant (approximately, constant). An allowable width range is set for the judgement of whether the target servo pressure is "constant" or not. It may be also configured that the control portion 171 judges that the target servo pressure is constant when the case that the difference between the target servo pressure between the current time and the time before the predetermined time falls within the predetermined range continues for a predetermined number of times.

It is noted here that the regulator 15a of the first embodiment has, structurally, a hysteresis depending on the position of the spool 15a2. For example, when the control mode is shifted from the pressure increasing control to the holding control, even the holding signal is inputted to the pressure decreasing valve 15b6 and the pressure increasing valve 15b7, the holding control cannot be realized immediately due to structural reasons and a time period that the spool 15a2 moves from the pressure increasing position to the holding position actually continues the pressure increasing state. Similarly, when the control mode is shifted from the pressure decreasing control to the holding control, even the holding signal has been inputted to the pressure decreasing valve 15b6 and the pressure increasing valve 15b7, the holding control cannot be realized immediately due to structural reasons and the pressure decreasing state actually continues for a time period until the spool 15a2 moves from the pressure decreasing position to the holding position. Thus, the booster mechanism 15 according to the first embodiment is configured to allow the inflow or outflow of the fluid with respect to the servo chamber R5 for a predetermined time period in response to the pressure increasing or decreasing signal which had been inputted immediately before the input of the holding signal even after the holding signal is input. The time period of opening or closing the ports PT13 or port PT14 is a factor of response delay.

The state judging portion 172 judges whether the state of the servo chamber R5 (current state of valve portion 15) is in the first state or not and whether the state of the servo chamber R5 is in the third state or not. The "first state" indicates the state where the actual servo pressure is increasing, although the holding signal has been inputted to the pressure decreasing valve 15b6 and the pressure increasing valve 15b7. The "third state" indicates the state where the actual servo pressure is decreasing, although the holding signal has been inputted to the pressure decreasing valve 15b6 and the pressure increasing valve 15b7. The state other than the first state and the third state is referred to as a second state.

The state judging portion 172 uses the calculation result (presumed result) of the position and the moving speed of the spool 15a2 for the state judgement. The state judging portion 172 can calculate the position of the spool 15a2 from the inflow or outflow amount of the brake fluid with respect to the pilot chamber R11, referencing, for example, the original position (initial position) of the spool 15a2. The state judging portion 172 can calculate the inflow or outflow amount of the brake fluid with respect to the pilot chamber R11 based on the instruction values to the pressure decreasing valve 15b6 and the pressure increasing valve 15b7. The state judging portion 172, for example, upon generation of pressure increasing signal, can calculate the flow amount of the brake fluid flowing into the pilot chamber R11 based on the control electric current value (control opening degree) to the pressure decreasing valve 15b7. The state judging portion 172, for example, can presume the position of the spool 15a2 from the inflow or outflow amount of the brake fluid with respect to the pilot chamber R11, the cross-sectional area of the spool 15a2, the initial capacity or volume of the pilot chamber R11, the position and the width of the ports PT13 and PT14 in an axial direction relative to the cylinder body 15a1 etc. Further, the state judging portion 172 can calculate the moving speed of the spool 15a2 from the position information on the spool 15a2. For example, the state judging portion 172 can calculate the moving direction and moving speed of the spool 15a2 from two or more pieces of position information calculated every predetermined time. The moving speed can be a differential value of the position information (displacement function).

The state judging portion 172 calculates the moving speed of the spool 15a2 at the time when the holding signal is outputted and at the time when the spool 15a2 moves from the pressure increasing or decreasing position towards the holding position. The moving speed of the spool 15a2 in which the spool 15a2 moves from the pressure increasing or decreasing position towards the holding position after the holding signal was inputted becomes slower as the spool 15a2 approaches the holding position. Accordingly, the moving speed of the spool 15a2 correlates with the change amount of the actual servo pressure in the time period from the current point up to the position where the spool reached at the holding position.

The state judging portion 172 calculates the moving direction and the moving speed of the spool 15a2 when the actual servo pressure enters the dead zone, and when the holding signal is inputted to the pressure decreasing valve 15b6 and the pressure increasing valve 15b7 and further a predetermined time period passed thereafter (this may be a predetermined time period from the output of the holding signal). The state judging portion 172 judges that the state of the servo chamber R5 is in the first state when the spool 15*a*2 is moving from the pressure increasing position towards the holding position and when the moving speed of the spool 15*a*2 is within a predetermined range (0<moving speed≤predetermined value). When the moving speed of the spool 15*a*2 is within the predetermined range, it means that the change inclination of the actual servo pressure is within a predetermined inclination range. The state judging portion 172 judges that the state of the servo chamber R5 is the third state when the spool 15*a*2 is moving from the pressure decreasing position towards the holding position and when the moving speed of the spool 15*a*2 is within a predetermined range. When the change inclination of the actual servo pressure is within the predetermined inclination range, the change of the actual servo pressure is judged to be caused by a returning time of the spool 15*a*2 to the holding position (hysteresis). The state judging portion 172 may judge the state using the actual servo pressure at the time when the control is shifted from the pressure increasing control or the pressure decreasing control to the holding control. By using the actual servo pressure at the time when the control is shifted from the pressure increasing control or the pressure decreasing control to the holding control, the change amount of the actual servo pressure at the time period of shifting from the pressure increasing control or the pressure decreasing control to the holding control can be presumed.

The dead zone hydraulic pressure setting portion 173 sets the second hydraulic pressure (upper limit value of the dead zone) higher when the state of the servo chamber R5 is judged to be in the first state judged by the state judging portion 172 than when the state of the servo chamber R5 is not judged to be in the first state (judged to be in the second state) judged by the state judging portion 172. In other words, the dead zone hydraulic pressure setting portion 173 sets the hydraulic pressure higher when the state of the servo chamber R5 is judged to be in the first state, than the normally set second hydraulic pressure of the dead zone with respect to the target servo pressure, as the second hydraulic pressure (the corrected second hydraulic pressure).

Figure 2:
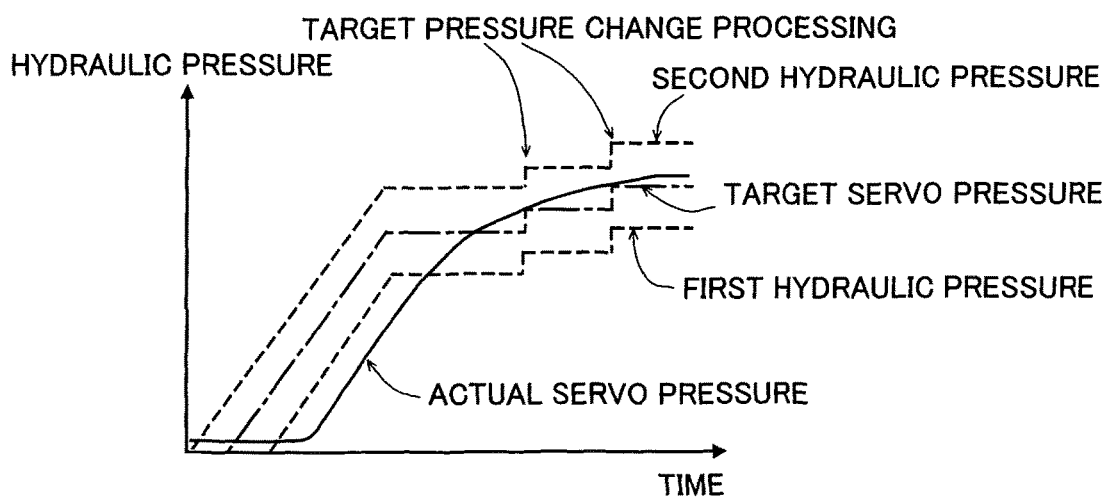
FIG. 2 is an explanatory view explaining a target pressure change processing according to the first embodiment.

In more detail, the dead zone hydraulic pressure setting portion 173 according to the first embodiment executes the target pressure change processing in which the target servo pressure approximates the actual servo pressure when the actual servo pressure is higher than the target servo pressure in the first state, in order to set the corrected second hydraulic pressure as the second hydraulic pressure. As shown in FIG. 2, when the target pressure change processing is executed, the target servo pressure increases to approximate the actual servo pressure. When the target servo pressure is raised, the second hydraulic pressure which is set higher than the target servo pressure by a predetermined value also increases. In other words, the dead zone hydraulic pressure setting portion 173 increases the dead zone which has a predetermined width set with respect to the target servo pressure together with the increase of the target servo pressure. The dead zone hydraulic pressure setting portion 173 according to the first embodiment matches the target servo pressure with the actual servo pressure by execution of the target pressure change processing when the actual servo pressure is higher than the target servo pressure in the first state.

Further, the dead zone hydraulic pressure setting portion 173 sets the first hydraulic pressure (lower limit value of the dead zone) lower than the first hydraulic pressure when the state of the servo chamber R5 is not judged to be the third state (judged to be in the second state) judged by the state judging portion 172, when the state of the servo chamber R5 is judged to be in the third state judged by the state judging portion 172. In other words, the dead zone hydraulic pressure setting portion 173 sets a lower hydraulic pressure (the corrected first hydraulic pressure) than the first hydraulic pressure in the dead zone normally set, as the first hydraulic pressure, when the state of the servo chamber R5 is judged to be in the third state.

Figure 3:
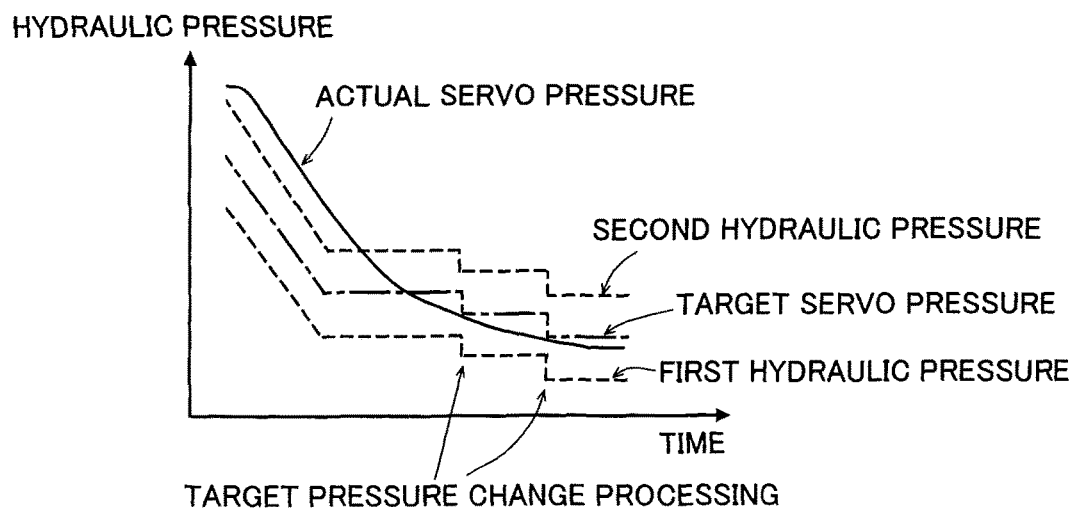
FIG. 3 is an explanatory view explaining a target pressure change processing according to the first embodiment.

In more detail, the dead zone hydraulic pressure setting portion 173 according to the first embodiment executes the target pressure change processing in which the target servo pressure approximates the actual servo pressure when the actual servo pressure is lower than the target servo pressure in the third state, in order to set the corrected first hydraulic pressure as the first hydraulic pressure. As shown in FIG. 3, when the target pressure change processing is executed, the target servo pressure decreases (drops) to approximate the actual servo pressure. When the target servo pressure drops, the first hydraulic pressure which has been set lower than the target servo pressure by a predetermined value also decreases. In other words, the dead zone hydraulic pressure setting portion 173 decreases the dead zone which has a predetermined width set with respect to the target servo pressure together with the decrease of the target servo pressure. The dead zone hydraulic pressure setting portion 173 according to the first embodiment agrees the target servo pressure with the actual servo pressure by execution of the target pressure change processing when the actual servo pressure is lower than the target servo pressure in the third state.

The dead zone hydraulic pressure setting portion 173 is configured to execute the target pressure change processing repeatedly and executes the target pressure change processing every predetermined time. In other words, upon repeated execution of the target pressure change processing, the dead zone hydraulic pressure setting portion 173 executes the target pressure change processing (for example, the first time execution) and after a predetermined time passed therefrom, executes the next target pressure change processing (the second time execution). In other words, the dead zone hydraulic pressure setting portion 173 executes the next-time target pressure change processing after the predetermined time passed from the first-time target pressure change processing, if the execution condition is satisfied (mainly that condition can be represented as "in the first state" and "the actual servo pressure>target servo pressure" or "in the third state" and "the actual servo pressure<target servo pressure").

As explained, the state judging portion 172 judges the state of the servo chamber R5 based on the moving speed of the spool 15*a*2, i.e., the increasing width or the decreasing width (change inclination) of the actual servo pressure per unit time. Then, the dead zone hydraulic pressure setting portion 173 executes the target pressure change processing based on the judgement result of the state judging portion 172. It is noted here that under the target servo pressure being in a constant state, the larger the change inclination of the actual servo pressure, the larger the difference between the target servo pressure and the actual servo pressure becomes. In other words, the larger the change inclination of the actual servo pressure, the larger the change amount of the target servo pressure by the target pressure change processing and in cooperation therewith, the larger the change amount of the first hydraulic pressure and/or the second hydraulic pressure becomes. As explained, the dead zone hydraulic pressure setting portion 173 sets the first or the second hydraulic pressure in response to the change width (increasing width or the decreasing width) of the actual servo pressure per unit time.

The total amount calculating portion 174 calculates the total amount of the change amount of the target servo pressure by the target pressure change processing. In other words, the total amount calculating portion 174 calculates the total of the change amount of the target servo pressure by the execution of up to the last time target pressure change processing. The total of the change amount is, for example, the absolute value of the total of the change amount, defining one side of the increasing or decreasing target servo pressure to be a positive side and the other side thereof to be a negative side. The total amount calculating portion 174 resets the total amount of the change amount when the application of the braking force to the wheel W is finished. In other words, in the first embodiment, counting cycle of the total of the change amount is set that one braking operation (from the start of braking operation to the end of the braking operation) is defined to be one cycle. The total amount calculating portion 174 sends the calculation result to the dead zone hydraulic pressure setting portion 173. Upon execution of the target pressure change processing, the dead zone hydraulic pressure setting portion 173 executes a target pressure change processing of this time when the total of the change amount (calculation result) is equal to or less than a predetermined defined amount. Oppositely, the dead zone hydraulic pressure setting portion 173 does not execute the target pressure change processing when the total of the change amount is greater than the predetermined defined amount. In other words, the execution condition for executing the target pressure change processing includes the condition that "the total of the change amount is equal to or less than the predetermined defined amount"

The leakage judging portion 175 detects whether the brake fluid leaks into the servo chamber R5 or the pilot chamber R11 via any route from the accumulator 15$b$2 and detects whether the brake fluid leaks from the servo chamber R5 or not. The "leakage (abnormality)" may be caused by for example, opening sticking of the pressure decreasing valve 15$b$6 or the pressure increasing valve 15$b$7, a breakage of conduit or hydraulic passage or a gap generated in the regulator 15$a$.

For example, the leakage judging portion 175 judges that a leakage is generated when the actual servo pressure continues to increase for a predetermined time period or more, even the instructions to the pressure increasing valve 15$b$7 from the control portion 171 is "to close". Further, the leakage judging portion 175 judges that a leakage is generated when the actual servo pressure continues to decrease for a predetermined time period or more, even the instructions to the pressure decreasing valve 15$b$6 from the control portion 171 is "to close". Further, the leakage judging portion 175 judges that a leakage is generated when the actual servo pressure is increasing or decreasing irrespective of the braking operation by the driver of the vehicle. Further, the leakage judging portion 175 may judge whether a leakage is generated or not by referencing the detected value of the pressure sensor 15$b$5 (accumulator pressure).

The leakage judging portion 175 sends the judgement result to the dead zone hydraulic pressure setting portion 173. The dead zone hydraulic pressure setting portion 173 does not execute the target pressure change processing when a leakage is judged to be generated by the leakage judging portion 175. In other words, it is preferable to include a condition that "a leakage is not judged to be generated by the leakage judging portion 175 (or the leakage judging portion 175 judges that a leakage is not generated)" as the execution condition of the target pressure change processing according to the first embodiment.

Figure 4:
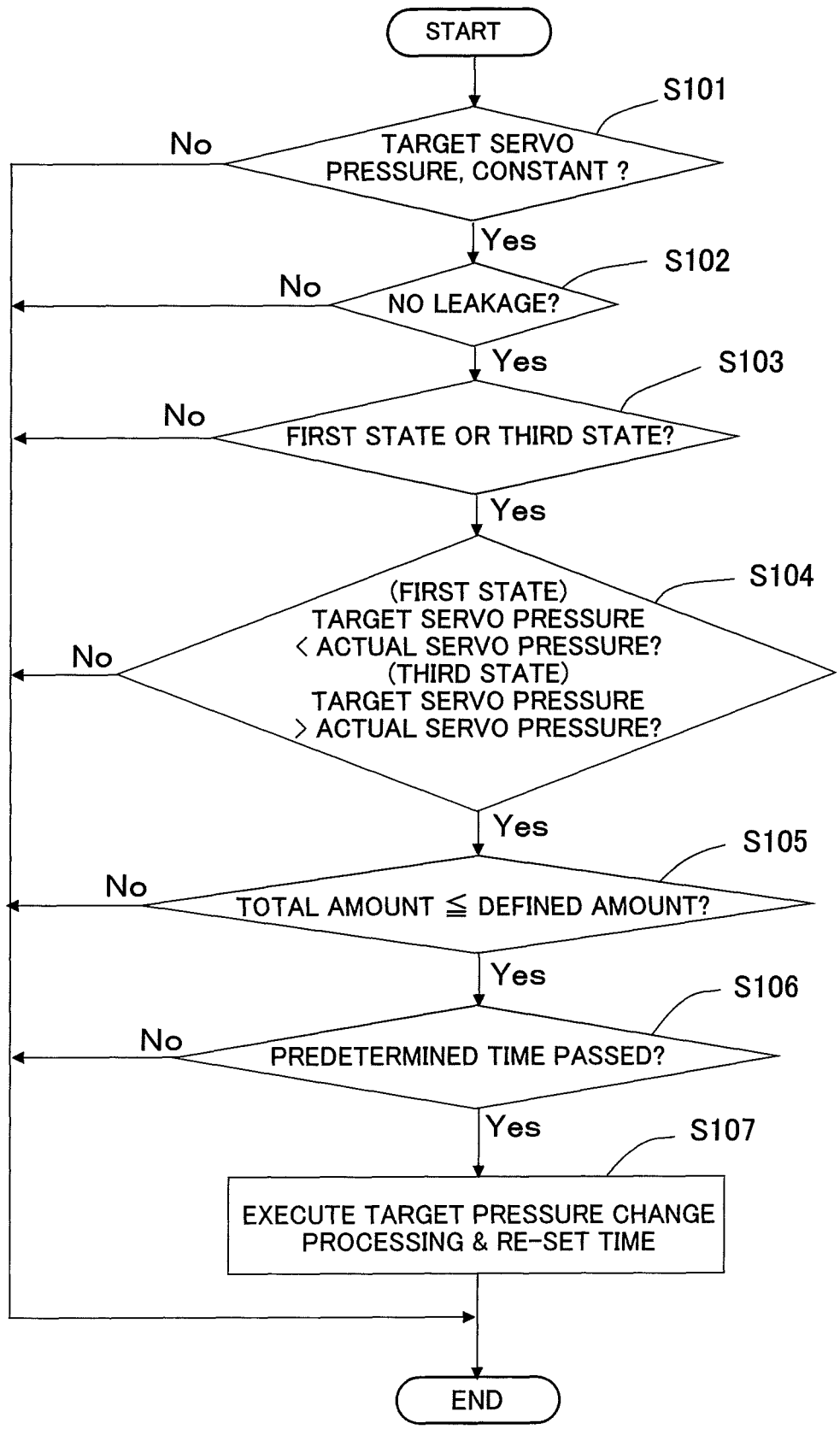
FIG. 4 is a flowchart explaining a target pressure change processing according to the first embodiment.

It is noted here that a flow of the target pressure change processing according to the first embodiment will be explained with reference to FIG. 4. First, when the target servo pressure is judged to be constant by the control portion 171 (S101; Yes), the leakage judgment is made by the leakage judging portion 175 whether any leakage is generated or not (S102). If no leakage is judged to be generated (S102; Yes), the state judging portion 172 judges whether "the state of the servo chamber R5 is in the first state or not or in the third state or not" (S103). It is noted here that at the step S103, it may be configured that the state judging portion 172 judges whether or not "the spool 15$a$2 is in a predetermined moving state in which the spool 15$a$2 moves towards the holding position with a moving speed within a predetermined range" and when the spool 15$a$2 is judged to be in the predetermined moving state, the control portion 171 judges whether the holding signal has been inputted to the pressure decreasing valve 15$b$6 and the pressure increasing valve 15$b$7 or not, i.e., whether the control mode of the control portion 171 is in the holding control or not. In this alternative configuration, the state judging portion 172 can judge whether the state is in the first state or the third state based on the moving direction of the spool 15$a$2.

When the state is judged to be in the first state or in the third state (S103; Yes), the dead zone hydraulic pressure setting portion 173 compares the target servo pressure with the actual servo pressure (S104). In the first state, if the actual servo pressure is higher than the target servo pressure, or, in the third state, if the actual servo pressure is lower than the target servo pressure (S104; Yes), the total amount calculating portion 174 calculates the total amount of the change amount and the dead zone hydraulic pressure setting portion 173 compares the calculation result with the predetermined defined amount (S105). When the total amount is equal to or less than the predetermined defined amount (S105; Yes), the dead zone hydraulic pressure setting portion 173 judges whether the predetermine time has passed or not from the previous target pressure change processing (S106). When the predetermine time has passed from the previous target pressure change processing (or "this time" is the first time in one braking operation) (S106; Yes), the dead zone hydraulic pressure setting portion 173 executes the target pressure change processing and the passed time is reset (S107).

On the other hand, when the target servo pressure is not constant (S101; No), when the leakage is generated (S102; No), when the state of the servo chamber R5 is in the second state (S103; No), when the magnitude correlation between the actual servo pressure and the target servo pressure does not satisfy the condition (S104; No), when the total amount of the change amount is greater than the predetermined defined amount (S105; No), or when the predetermined time has not passed from the last time target pressure change processing (S106; No), no target pressure change processing is executed.

Advantageous Effect

According to the hydraulic pressure control device C of the first embodiment, in the first state where the actual servo pressure can be a hydraulic pressure outside the dead zone (upper side of the dead zone), the movement of the actual servo pressure from the dead zone caused by the increase of the actual servo pressure in the holding control can be suppressed by the increase of the second hydraulic pressure which corresponds to the upper limit value of the dead zone. Similarly, in the third state where the actual servo pressure can be a hydraulic pressure outside the dead zone (lower side of the dead zone), the movement of the actual servo pressure from the dead zone caused by the decrease of the actual servo pressure in the holding control can be suppressed by the decrease of the first hydraulic pressure which corresponds to the lower limit value of the dead zone. Accordingly, the frequency of control mode change can be reduced to improve the brake feeling of the driver of the vehicle and at the same time the durability of components associated with the control (for example, the pressure decreasing valve 15$b$6 and the pressure increasing valve 15$b$7) can be improved. The change of control mode can be prevented by keeping the actual servo pressure within the dead zone during the response delay time caused by the hysteresis generated upon shifting of control from the pressure increasing control to the holding control or the hysteresis generated upon shifting of control from the pressure decreasing control to the holding control.

Further, according to the first embodiment, the first hydraulic pressure or the second hydraulic pressure can be set in response to the change of the actual servo pressure per unit time (change inclination). Therefore, even in the state where the actual servo pressure easily comes off the dead zone, (the state that the change inclination is large), the change amount of the dead zone can be increased in response to such tendency. In other words, according to the first embodiment, the change of control mode can be properly suppressed depending on the situation.

Further, in the first embodiment, when the change inclination of the actual servo pressure is within the predetermined inclination range, the first hydraulic pressure is set to the corrected first hydraulic pressure or the second hydraulic pressure is set to the corrected second hydraulic pressure. When the actual servo pressure enters the dead zone and the actual servo pressure gradually changes (increasing or decreasing), the braking operation is performed gradually not to let the driver of the vehicle to know the change of the braking force applied to the vehicle (deceleration). Under such situation, when the actual servo pressure comes out of the dead zone, for example, the actual servo pressure moves upper side beyond the dead zone, the control mode is changed from the holding control to the pressure decreasing control to reduce the actual servo pressure. When the pressure decreasing control is executed under the situation that the driver of the vehicle is not noticing the change of braking force, the braking force is decreased to generate a possibility that the driver of the vehicle feels an acceleration. In other words, when the control mode is shifted to the pressure decreasing or the pressure increasing control from the holding control, under the situation that the driver is not noticing the change of braking force (i.e., under the state that the driver can easily feel the change of the braking force), the driver's brake feeling may be easily affected thereby. However, according to the first embodiment, when the actual servo pressure is gradually changed, the target pressure change processing is executed to suppress the influence thereof on the driver's brake feeling.

Further, according to the first embodiment, the target pressure change processing is executed when the actual servo pressure is higher than the target servo pressure in the first state or when the actual servo pressure is lower than the target servo pressure in the third state. The target pressure change processing is set as a process that makes the target servo pressure agree to the actual servo pressure. Therefore, under a necessary situation, the second hydraulic pressure is surely set to a high pressure, whereas the first hydraulic pressure is surely set to a low pressure. As a controlling method, it is only enough to make the target servo pressure agree to the actual servo pressure, which simplifies the control method.

Further, by repeatedly executing the target pressure change processing, the actual servo pressure easily enters the dead zone and continues to be within the dead zone. However, due to such continuing to be within the dead zone, the movement of the actual servo pressure out of the dead zone caused by the change of the target servo pressure may be delayed. However, according to the first embodiment, it is judged for the execution condition of the target pressure change processing every predetermined time by the brake ECU 17 and accordingly, under the condition that satisfies the execution of target pressure change processing, the target pressure change processing is executed every predetermined time. This can suppress increase of the change amount of the first hydraulic pressure or the second hydraulic pressure by the target pressure change processing and the increase of the number of processing, i.e., the control delay (delay in pressure increasing or decreasing operation) which may be possibly generated due to an excess number of times of target pressure change processing can be suppressed.

Further, according to the first embodiment, the target pressure change processing is not executed when the total amount of the change amount caused by the target pressure change processing exceeds a predetermined defined amount. Therefore, this can also suppress the generation of the control delay. Further, according to the first embodiment, existence of leakage can be detected and when no leakage is detected, the target pressure change processing is executed only when the actual servo pressure is not fluctuated by turbulence. Thus, continuing of execution of target pressure change processing due to abnormality can be prevented. The target pressure change processing is a different control processing from the pressure decreasing control, the holding control and the pressure increasing control under normal braking operation and is considered as one of the "specific controls" which keeps the actual servo pressure to be within the dead zone.

Second Embodiment

The hydraulic pressure control device C according to the second embodiment is different from the first embodiment in a point that the brake ECU 17 in the second embodiment executes a specific pressure decreasing control or a specific pressure increasing control as the "specific control". The components and the structures in the second embodiment which are same as those in the first embodiment are designated with the same symbols and numerals but detail explanation thereof will be omitted. The portions different from the first embodiment will be explained hereinafter. The drawings which are used for the explanation of the first embodiment can be used for the explanation of the second embodiment. Further, according to the second embodiment, the regulator 15$a$, the pressure decreasing valve 15$b$6 and the pressure increasing valve 15$b$7 form the valve portion which adjusts the inflow or outflow of the brake fluid with respect to the servo chamber R5.

Figure 5:
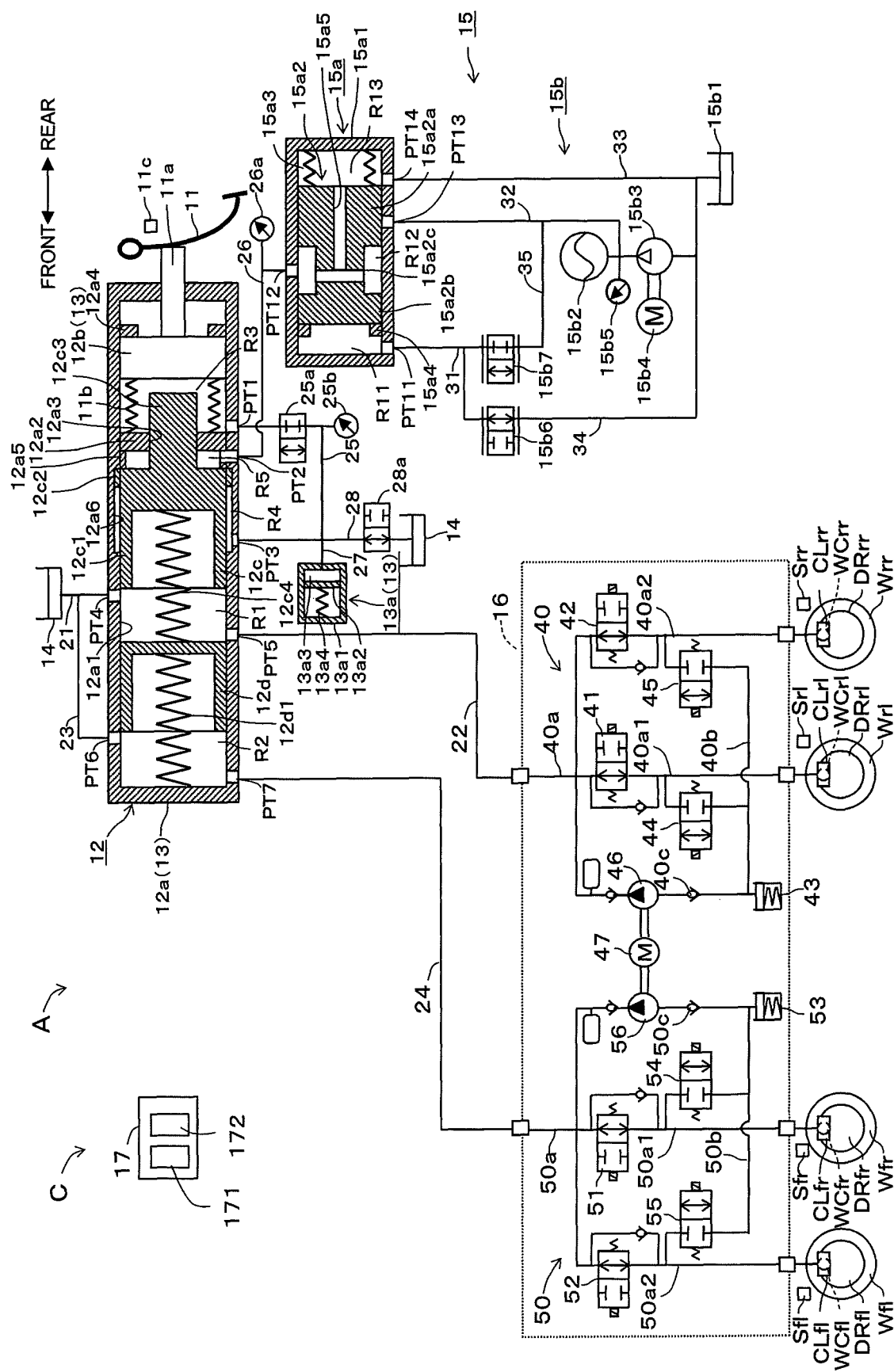
FIG. 5 is an outline schematic view of a hydraulic pressure control device according to a second embodiment of the invention.

The brake ECU 17 includes a control portion 171 and a state judging portion 172 as a function, as shown in FIG. 5. The control portion 171 executes the normal brake control and, in addition thereto, executes a specific control to keep the actual servo pressure to be a hydraulic pressure within the dead zone under a certain situation. The specific control according to the second embodiment includes a specific pressure decreasing control which outputs a pressure decreasing signal to the pressure decreasing valve 15b6, instructing the pressure decreasing valve 15b6 to let the fluid flow out of the servo chamber R5 when the state of the servo chamber R5 is judged to be in the first state by the state judging portion 172 and a specific pressure increasing control which outputs a pressure increasing signal to the pressure increasing valve 15b7, instructing the pressure increasing valve 15b7 to let the fluid flow into the servo chamber R5 when the state of the servo chamber R5 is judged to be in the third state by the state judging portion 172. In other words, the specific control according to the second embodiment includes the specific pressure decreasing control which opens a pressure decreasing valve 15b6, when the state of the servo chamber R5 is judged to be in the first state by the state judging portion 172 and the specific pressure increasing control which opens the pressure increasing valve 15b7 when the state of the servo chamber R5 is judged to be in the third state by the state judging portion 172.

For example, the control portion 171 outputs a valve opening current as a control current to the pressure decreasing valve 15b6 (or the pressure increasing valve 15b7) for a predetermined time period (for example, extremely short time period). The pressure decreasing signal or the pressure increasing signal corresponds to the control current for controlling the pressure decreasing valve 15b6 and/or the pressure increasing valve 15b7. Since the pressure decreasing valve 15b6 is formed as a normally open type electromagnetic valve, the control current to the pressure decreasing valve 15b6 is decreased by the specific pressure decreasing control. Oppositely, the pressure increasing valve 15b7 is formed as a normally closed type electromagnetic valve, the control current to the pressure increasing valve 15b7 is increased by the specific pressure increasing control. It is noted here that according to the second embodiment, the predetermined time period for the specific pressure decreasing control and the predetermined time period for the specific pressure increasing control are set to be the same time period. However, different time period may be set to the specific pressure decreasing control and the specific pressure increasing control or the predetermined time period itself may not be set.

The state judging portion 172 judges the state of the servo chamber R5 based on the calculation result (presumption result) of the position and the moving speed of the spool 15a2 or based on the pressure increasing inclination of the actual servo pressure, as similar to the method in the first embodiment. The state judging portion 172 judges whether or not the state of the servo chamber R5 is in the state that the actual servo pressure is fluctuated, even under the situation that the holding signal has been inputted to the valve portion (the pressure decreasing valve 15b6 and the pressure increasing valve 15b7), as similar to the method in the first embodiment.

The control portion 171 stops the specific pressure decreasing control when a value associated with the change amount towards the decreasing side of the actual servo pressure becomes equal to or more than a predetermined value, during the specific pressure decreasing control. Further, the control portion 171 stops the specific pressure increasing control when a value associated with the change amount towards the increasing side of the actual servo pressure becomes equal to or more than a predetermined value, during the specific pressure increasing control. According to the second embodiment, as the value associated with the change amount of the actual servo pressure, the change amount of the actual servo pressure (detected value of the pressure sensor) is used. However, the change amount of the wheel cylinder pressure, the change amount of the master cylinder pressure or the change amount of the deceleration, etc., may be used as such value.

Detail explanation for the specific pressure decreasing control will be made hereinafter. The specific pressure decreasing control is executed when the state of the servo chamber R5 is judged to be in the first state by the state judging portion 172, for example, when the actual servo pressure is increasing during the holding control that is executed after the pressure increasing control has been shifted to the holding control. The control portion 171 includes a plurality of threshold values for the actual servo pressure in the dead zone and every time the actual servo pressure exceeds one of the threshold values, changes the control current which is the pressure decreasing signal to the pressure decreasing valve 15b6 outputted in the specific pressure decreasing control so that the fluid amount flowing out of the servo chamber R5 (flowing out amount of fluid from the servo chamber R5) towards the increasing side. In other words, the control portion 171 changes the control current to the pressure decreasing valve 15b6 outputted in the specific pressure decreasing control to an opening side of the pressure decreasing valve 15b6, every time the actual servo pressure exceeds the threshold value.

Figure 6:
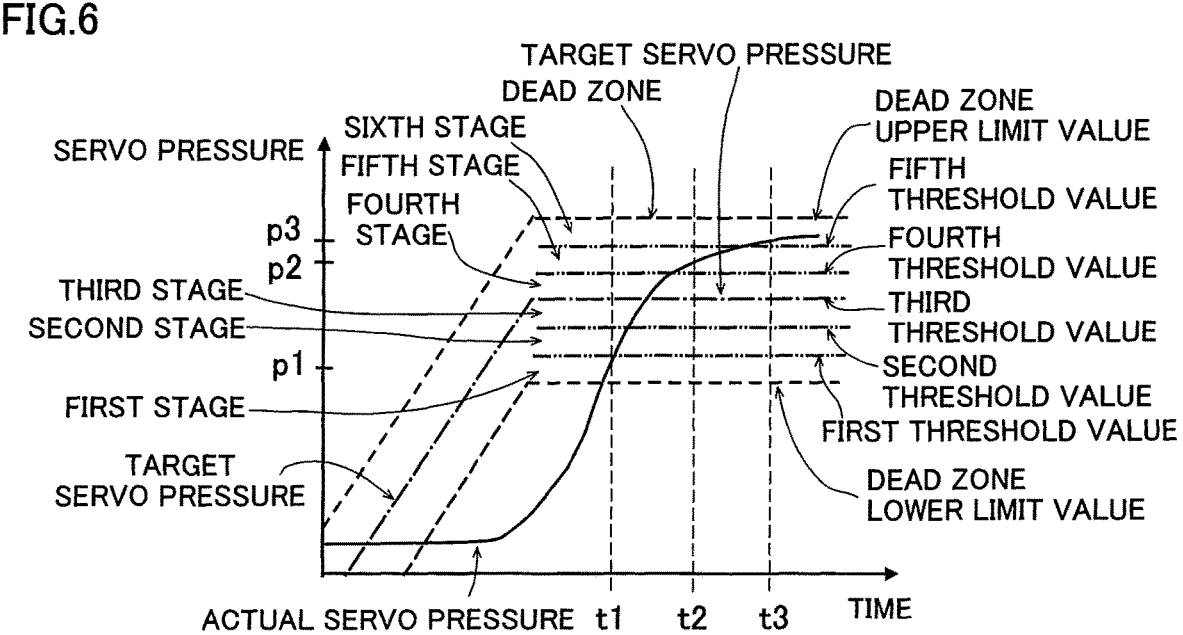
FIG. 6 is an explanatory view explaining a specific pressure decreasing control according to the second embodiment.

As a concrete example, as shown in FIG. 6, first, second, third, fourth and fifth threshold values are set within the dead zone according to the second embodiment. In other words, the dead zone is divided into six stages, i.e., the first state which is the range of value from the lower limit value of the dead zone to the first threshold value, the second stage which is the range from the first threshold value to the second threshold value, the third stage which is the range from the second threshold value to the third threshold value (Here, the third threshold value coincides with the target servo pressure in this stage), the fourth stage which is the range from the third threshold value to the fourth threshold value, the fifth stage which is the range from the fourth threshold value to the fifth threshold value and the sixth stage which is the range from the fifth threshold value to the upper limit value of the dead zone. The control portion 171 lessens control current outputted to the pressure decreasing valve 15b6 in the specific pressure decreasing control every time the actual servo pressure exceeds one of the threshold values, i.e., every time the stage changes. In other words, the control portion 171 increases the current value (subtracting value) subtracted from the valve opening current in response to the increase of the number of times of exceeding the threshold value.

Figure 7:
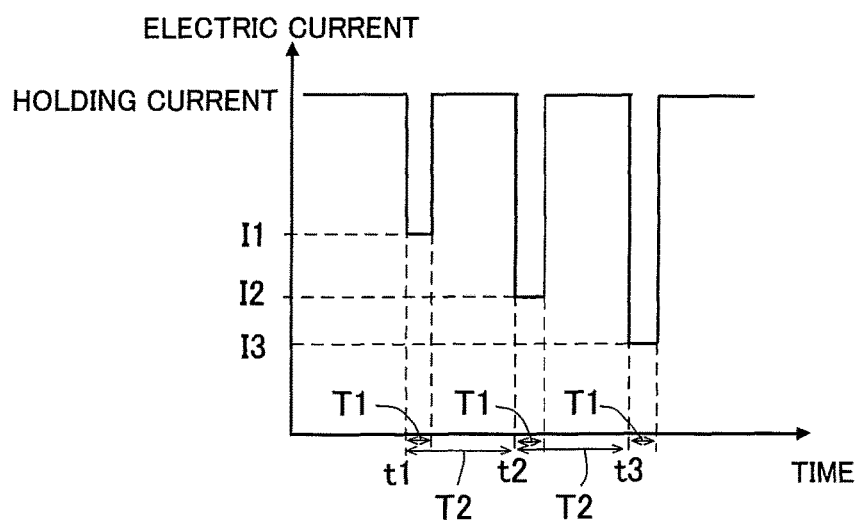
FIG. 7 is an explanatory view explaining a specific pressure decreasing control according to the second embodiment.

As shown in FIGS. 6 and 7, the control portion 171 changes the control current to the pressure decreasing valve 15b6 from the holding current (valve closing current) to the electric current I1 at the time t1 and returns to the holding current after a predetermined time T1 passed from the time t1. The actual servo pressure p1 at the time t1 is positioned within the first stage (position which does not exceed the first threshold value) and the electric current I1 is set to the valve opening current corresponding to the actual servo pressure p1. Then, the control portion 171 changes the control current to the pressure decreasing valve 15b6 from the holding current to the electric current I2 at the time t2 and returns to the holding current after the predetermined time T1 passed from the time t2. The actual servo pressure p1 at the time t2 is positioned within the fourth stage and the electric current I2 is set to a value subtracting a predetermined subtracting amount Im1 from the valve opening current Ip2 corresponding to the actual servo pressure p2 (I2=Ip2−Im1). According to the second embodiment, the predetermined subtracting amount is set by adding the unit subtracting amount Im0 every time the stage advances (in number increasing direction), i.e., the number of times of the actual servo pressure exceeding the threshold value. In other words, the predetermined subtracting amount Im1 is defined by the unit subtracting amount Im0 multiplied by the number of times of exceeding the threshold value, (Im1=Im0×3). (in this example, exceeding three (3) times).

The control portion 171 changes the control current to the pressure decreasing valve 15b6 from the holding current to the electric current I3 at the time t3 and returns to the holding current after the predetermined time T1 passed from the time t3. The actual servo pressure p3 at the time t3 is positioned within the fifth stage and the electric current I3 is set to a value subtracting a predetermined subtracting amount Im2 (Im2=Im0×4) from the valve opening current Ip3 corresponding to the actual servo pressure p3 (I3=Ip3−Im2). In the specific pressure decreasing control, the more the number of times that the actual servo pressure exceeds the threshold values, (the further the stage advances), the larger the subtracting amount subtracting from the valve opening current (predetermined subtracting amount) is set thereby to change the control current towards the valve opening side.

Further, the execution interval for the specific control (minimum execution interval) is set to the second predetermined time T2 which can detect a reaction (influence) that would react on (influence on) the actual servo pressure by the execution of the specific control. In other words, the control portion 171 executes the specific pressure decreasing control of this time at least the second predetermined time T2 or more passed from the execution of the specific pressure decreasing control of previous time, when the specific pressure decreasing control is executed a plurality of times in the control within the one dead zone (from the time the actual servo pressure enters the dead zone to the time when the actual servo pressure comes out of the dead zone). According to the embodiment, when the structure which generates a hysteresis such as the structure including the regulator 15a, it takes a time from the execution of the pressure decreasing or increasing control until such control is reflected on the actual servo pressure due to the generation of hysteresis. This response time can be for example obtained from the calculation based on the structure, simulation, or experimental work. The second predetermined time T2 is set in advance in the brake ECU 17 based on the obtained result. (response time≤second predetermined time T2).

The control portion 172 according to the second embodiment does not execute the specific pressure decreasing control, when the stage in which the actual servo pressure at the previous specific pressure decreasing control is positioned and the stage in which the actual servo pressure at the time after the second predetermined time T2 passed from the time the actual servo pressure of the previous specific pressure decreasing control is positioned are the same. It is because if the stage is not moved for the second predetermined time period, the actual servo pressure can be presumed to be substantially kept to the constant value. In other words, when the stage of the actual servo pressure is shifted (when the actual servo pressure exceeds a threshold value), the specific pressure decreasing control of this time (the following) after the second predetermined time T2 passed from the time the previous specific pressure decreasing control was executed. Further, in the state that the second predetermined time T2 passed from the previous time specific pressure decreasing control, if the stage of the actual servo pressure is shifted, upon shifting, the specific pressure decreasing control is executed in accordance with the shifted stage (stage after shifting). It is noted that in FIG. 6, the execution condition whether the specific control is executed or not is determined in the control portion 171 from the time the actual servo pressure is positioned in the dead zone until the time t1.

On the other hand, the specific pressure increasing control is executed in a different situation (i.e., in the third state). In other words, the specific pressure increasing control is executed when the executed when the state of the servo chamber R5 is judged to be in the third state by the state judging portion 172, for example, when the actual servo pressure is decreasing during the holding control that is executed after the pressure decreasing control has been shifted to the holding control. The control portion 171 sets a plurality of threshold values for the actual servo pressure in the dead zone and every time the actual servo pressure becomes less than one of the threshold values, the control portion 171 changes the control current which is the pressure increasing signal to the pressure increasing valve 15b7 outputted in the specific pressure increasing control so that the fluid amount flowing into the servo chamber R5 (flowing into amount of fluid into the servo chamber R5), towards the decreasing side. In other words, the control portion 171 changes the control current to the pressure increasing valve 15b7 outputted in the specific pressure increasing control to an opening side of the pressure increasing valve 15b7, every time the actual servo pressure becomes less than one of the threshold values.

Figure 8:
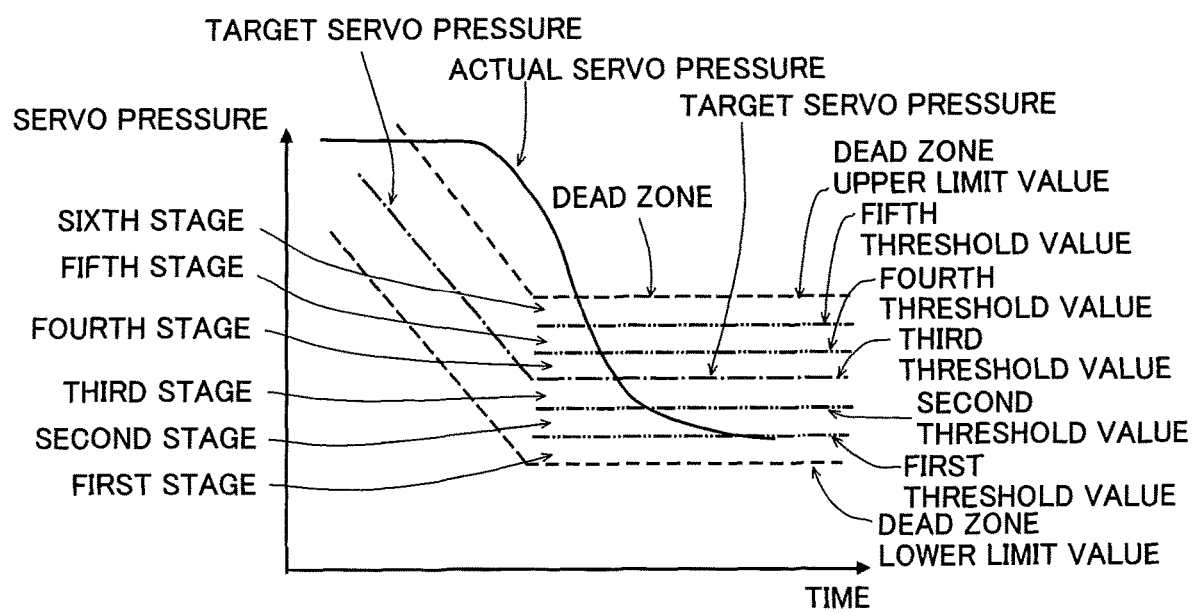
FIG. 8 is an explanatory view explaining a specific pressure increasing control according to the second embodiment.

As a concrete example, as shown in FIG. 8, first to fifth threshold values are set within the dead zone according to the second embodiment as similar to the above. In other words, the dead zone is divided into six stages, i.e., first stage to sixth stage. The pressure increasing valve 15b7 is a normally closed type electromagnetic valve and the control portion 171 increases the control current outputted to the pressure increasing valve 15b7 in the specific pressure increasing control every time the actual servo pressure becomes less than one of the threshold values, i.e., every time the stage changes (here, every time the stage changes in the number decreasing direction). In other words, the control portion 171 increases the current value (adding value) adding to the valve opening current in response to the increase of the number of times of falling below the threshold value. The adding amount (predetermined adding amount) is calculated by the unit adding amount Ie0 multiplied by the number of times "n" of falling below the threshold value, (Ie1=Ie0×n), as similar to the calculation of the subtracting amount. It is noted that the predetermined subtracting amount or the predetermined adding amount may be set independently in each stage.

The control portion 171 opens the pressure increasing valve 15b7 for a predetermined time T1 by the control current according to the stage where the actual servo pressure is positioned (in response to the number of times that the actual servo pressure in the stage falls below the threshold value). Similar to the specific pressure decreasing control, the control portion 171 executes the specific pressure increasing control of this time (next) after the second predetermined time T2 passed from the previous time specific pressure increasing control when the stage of the actual servo pressure is shifted (when the actual servo pressure falls below the threshold value). Further, the control portion 171 executes the specific pressure increasing control in response to the stage after shifting under the situation that the second predetermined time has passed since the previous time specific pressure increasing control was executed.

The control portion 171 stops further execution of the specific control in the dead zone when the change amount of the actual servo pressure by the specific control becomes equal to or more than a predetermined value. It is noted that the number of times of the execution of the specific control within one dead zone (from the time the actual servo pressure enters the dead zone to the time when the actual servo pressure comes out of the dead zone) may be limited to a predetermined number of times. In such case, the control portion 171 stops next and thereafter specific control when the change amount of the actual servo pressure by the specific control becomes equal to or more than a predetermined value, even the number of times of the execution is not reached to the predetermined number of times.

Figure 9:
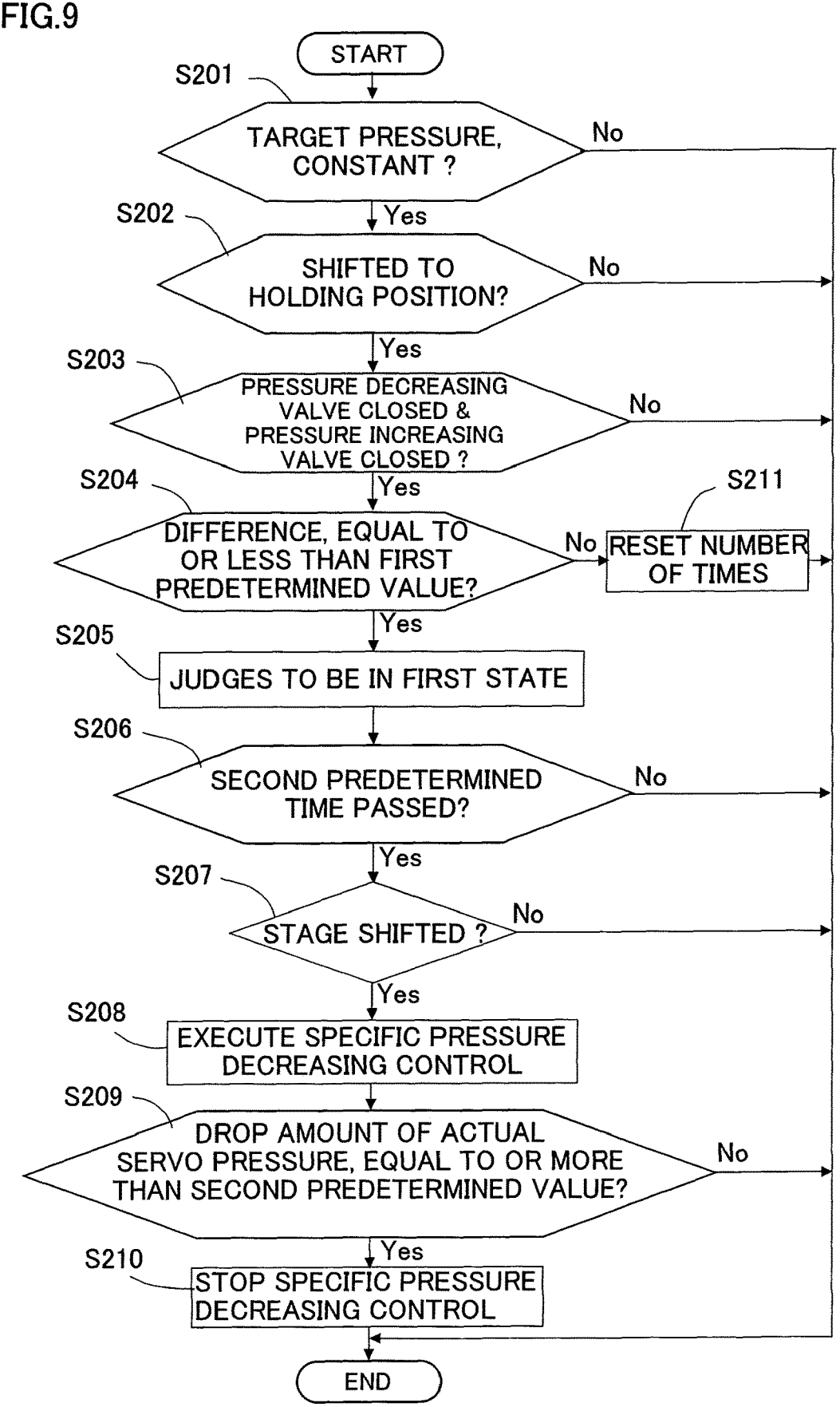
FIG. 9 is a flowchart explaining the specific pressure decreasing control according to the second embodiment.

It is noted here that a flow of the specific control by the brake ECU 17 according to the second embodiment will be explained with reference to FIG. 9, explaining the specific pressure decreasing control as an example of the specific control. First, the state judging portion 172 judges the state of the servo chamber R5 (S201~S204). In detail, the state judging portion 172 judges whether the target servo pressure set by the control portion 171 is constant (zero inclination) or not (S201). When the target servo pressure is judged to be constant by the control portion 171 (S201; Yes), the state judging portion 172 judges whether or not the spool 15a2 of the regulator 15a is moving towards the holding position from the pressure increasing position within a predetermined speed (S202), based on the calculation similar to the first embodiment. When the spool 15a2 is moving towards the holding position with the predetermined speed (S202; Yes), the state judging portion 172 judges whether the pressure decreasing valve 15b6 and the pressure increasing valve 15b7 are closed or not (whether the pressure decreasing or increasing control is in stopped state or not) (S203). If both of the pressure decreasing valve 15b6 and the pressure increasing valve 15b7 are closed (S203; Yes), the state judging portion 172 judges whether the difference between the target servo pressure and the actual servo pressure is equal to or less than a first predetermined value, i.e., whether the actual servo pressure is within the dead zone or not (S204). If the actuals servo pressure is within the dead zone (S204; Yes), the state judging portion 172 judges that the state of the servo chamber R5 is in the first state considering that the pressure increasing state continues by the movement of the spool 15a2, even during the holding control. (S205).

Then, the control portion 171 judges whether the second predetermined time T2 has passed from the execution of the previous specific pressure decreasing control or not (S206). When the second predetermined time T2 has passed (S206; Yes), the control portion 171 judges whether the current stage of the actual servo pressure has been shifted from the stage of the previous time specific pressure decreasing control or not (S207). When the stage of the actual servo pressure has been shifted (S207; Yes), the control portion 171 executes the specific pressure decreasing control based on the shifted stage and increases the number of counts of execution times. (S208). During the execution of the specific pressure decreasing control, the control portion 171 judges whether the actual servo pressure drops to the pressure equal to or more than the predetermined value comparing with the actual servo pressure at the time of starting the specific pressure decreasing control (S209). When the actual servo pressure drops to the pressure equal to or more than the second predetermined value (S209; Yes), the control portion 171 stops the specific pressure decreasing control of this time and the following specific pressure decreasing controls within the current dead zone (S210) and executes the holding control.

When the judgements at the steps S201 through S204, S206, S207 and S209 are "No", the specific pressure decreasing control is not executed. Further, when the difference between the target servo pressure and the actual servo pressure is not equal to or less than the predetermined value (S204; No), the number of times of execution of the specific pressure decreasing control and the subtracting amount are reset (S211). Further, shifting of the stage at the specific pressure decreasing control of the first time since the actual servo pressure enters the dead zone is made from non-stage state to any one of the stages and accordingly, the judgement at the step S207 is automatically the "Yes" judgment. Such processing is executed with a predetermined interval. The flow of control above is similar to the flow of the specific pressure increasing control. The explanation of the first embodiment can be referred for explanation of each judgement in the flow.

Advantageous Effect

According to the second embodiment, even the state of the servo chamber R5 becomes the first state or the third state due to the generation of hysteresis caused by a structural reason, a limited control (specific control) which outputs the valve opening electric current to the corresponding electromagnetic valve only for a predetermined time period T1 can be executed at least one time. Therefore, the actual servo pressure under holding control can be quickly shifted to the constant state. In other words, when the target servo pressure is constant, the variation of the actual servo pressure can be suppressed by the specific control and accordingly, the actual servo pressure can be prevented from frequent entering or coming out of the dead zone and the frequent repetition of pressure decreasing and increasing controls can be avoided. Thus, for example, the deterioration of the regulator 15a, the pressure decreasing valve 15b6 and the pressure increasing valve 15b7 (components associated with the flow amount control) can be prevented to improve the durability thereof. By suppressing the variation of the actual servo pressure, the deterioration of the brake feeling can be prevented to give an improved comfortable brake feeling to the driver of the vehicle.

Further, the control portion 171 stops the specific control when the actual servo pressure reacts by the specific control, i.e., when the difference between the actual servo pressure at the time of starting the specific control and the actual servo pressure of current time (change amount to the control side) becomes equal to or more than the predetermined value. Therefore, the change of the actual servo pressure in a reverse direction by the specific control (decrease of the actual servo pressure in the first state, or the increase of the actual servo pressure in the third state) can be suppressed. The control portion 171 stops the specific control when the value associated with the change amount of the actual servo pressure towards the pressure decreasing side (or the pressure increasing side) becomes equal to or more than a predetermined value, depending on the situation during the specific control.

Further, the control portion 171 changes the control electric current outputted by the specific control to the valve opening side, every time when the actual servo pressure exceeds a threshold value in the dead zone. Therefore, the following cases may occur. This is, even the specific control is executed, the increase of the actual servo pressure in the first state or the decrease of the actual servo pressure in the third state cannot be suppressed due to a variation of the valve opening current to the pressure decreasing valve 15b6 and the pressure increasing valve 15b7 (for example, difference between the learning value ("initially set value") and the true value) or a sliding resistance generated at the regulator 15a. However, the specific control of next time and thereafter can more effectively reflect on the actual servo pressure.

Further, according to the second embodiment, the execution interval of the specific control in one dead zone can be assured for a time equal to or longer than the second predetermined time period and accordingly, with confirmation of the influence of the specific control on the actual servo pressure, the next specific control can be executed. In other words, according to the second embodiment, any unnecessary execution of the specific control can be avoided. It is noted here that only one value is set as the threshold value in the dead zone. In such case, the dead zone can be divided into two stages.

Third Embodiment

The hydraulic pressure control device C according to the third embodiment includes "the target pressure change processing" of the first embodiment and "the specific pressure decreasing control" and "the specific pressure increasing control" of the second embodiment. In other words, the brake ECU 17 which has the functions explained in the first and the second embodiments includes the control portion 171, the state judging portion 172, the dead zone hydraulic pressure setting portion 173, the total amount calculating portion 174 and the leakage judging portion 175. The explanation of the third embodiment can be made with reference to the drawings which are used for explaining the first and the second embodiments.

The control portion 171 executes the target pressure change processing, the specific pressure decreasing control or the specific pressure increasing control according to, for example, the setting conditions when the state of the servo chamber R5 is in the first state or in the third state. As one example, the control portion 171 executes only the target pressure change processing as the specific control until the total amount of the change amount by the target pressure change processing exceeds a predetermined defined amount and executes (execution permissible state) the specific pressure decreasing control or the specific pressure increasing control as the specific control after the total amount of the change amount by the target pressure change processing exceeds a predetermined defined amount. As explained above, the execution permissible period of the target pressure change processing may be switched over to the execution permissible period of the specific pressure decreasing control or the specific pressure increasing control at the control portion 171 based on the judgement whether the predetermined condition is satisfied or not. According to the third embodiment, when the target servo pressure is constant, the actual servo pressure can be surely prevented from coming out of the dead zone. In other words, the repeated pressure decreasing control and the pressure increasing control when the target servo pressure is constant can be suppressed to improve the durability of the pressure decreasing valve 15b6 and the pressure increasing valve 15b7 and at the same time improve the brake feeling.

Modified Embodiment

Figure 10:
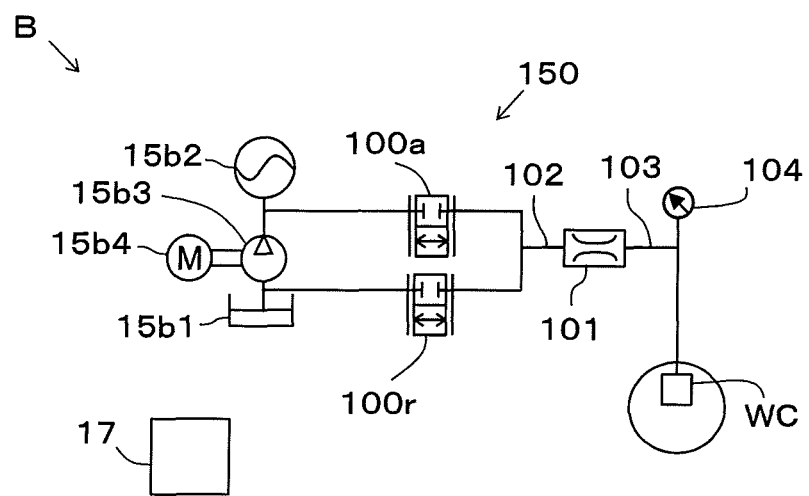
FIG. 10 is a modified embodiment of the embodiments.

The present invention is not limited to the embodiments explained above and for example, as shown in FIG. 10, the invention can be applicable to the brake system (hydraulic pressure braking force generating device) B. As shown in FIG. 10, the brake system B includes the valve portion 150 and the pressure sensor 104, the wheel cylinder WC and the brake ECU 17. The valve portion 150 includes the reservoir 15b1, the accumulator 15b2, the pump 15b3, the motor 15b4, the pressure increasing valve 100a, the pressure decreasing valve 100r, the throttle element 101 and the hydraulic passages 102 and 103. The pressure increasing valve 100a is a linear valve and is provided between the accumulator 15b2 and the hydraulic passage 102. The pressure decreasing valve 100r is a linear valve and is provided between the reservoir 15b1 and the hydraulic passage 102. The accumulator 15b2 is connected to the wheel cylinder WC through the pressure increasing valve 100a, the hydraulic passage 102, the throttle element 101 and the hydraulic passage 103. The reservoir 15b1 is connected to the wheel cylinder WC via the pressure decreasing valve 100r, the hydraulic passage 102, the throttle element 101 and the hydraulic passage 103. In other words, the hydraulic passage 102 connects the pressure increasing valve 100a and the pressure decreasing valve 100r and the throttle element 101. The hydraulic passage 103 connects the throttle element 101 and the wheel cylinder WC. The brake ECU 17 controls the hydraulic pressure in the wheel cylinder WC by controlling the pressure increasing valve 100a and the pressure decreasing valve 100r. The pressure sensor 104 is connected to the hydraulic passage 103.

In the brake system B, by controlling the pressure increasing valve 100a and the pressure decreasing valve 100r, the brake fluid in the hydraulic passage 102 (or the hydraulic passage 103) flows into the hydraulic passage 103 (or hydraulic passage 102) through the throttle element 101, even the control is shifted from the pressure increasing control or the pressure decreasing control to the holding control (for example, control which closes the pressure increasing valve 100a and the pressure decreasing valve 100r). In other words, the brake fluid flows into or out of the hydraulic passage 103, i.e., based on the hydraulic pressure of the brake fluid detected by the pressure sensor 104, even the control is shifted from the pressure increasing control or the pressure decreasing control to the holding control, the hydraulic pressure of the brake fluid detected by the pressure sensor 104 is fluctuated due to the inflow and or outflow of the brake fluid. The valve portion 150 is configured to allow the variation of the actual pressure accompanying the movement of the fluid in the hydraulic passage 103 (wheel cylinder WC) for a predetermined period time according to the increasing and decreasing signal inputted immediately before the input of the holding signal. In this case, the state judging portion 172 for example, can judge a state (whether the state is in the first state or in the third state) based on the opening degree (magnitude of control current) of the pressure increasing valve 100a and the pressure decreasing valve 100r at the time of shifting of the control from the pressure increasing control or the pressure decreasing control to the holding control and the hydraulic pressure of the brake fluid detected by the pressure sensor 104. The invention can be applicable to the structure shown in FIG. 10 and similar effects of the embodiments as explained above can be achieved.

(Others)

The state judging portion 172 may be configured to judge the change inclination (rise or drop) of the actual servo pressure based on the detected value of the pressure sensor 26a. Further, the state judging portion 172 may be also configured to judge the moving direction of the spool 15a2 based on the control mode switching by the control portion 171. In this case, the state judging portion 172 judges that the state of the servo chamber R5 is in the first state when the control is shifted from the pressure increasing control to the holding control and the increasing inclination of the actual servo pressure is within the predetermined range inclination. Further, the state judging portion 172 judges that the state of the servo chamber R5 is in the third state when the control is shifted from the pressure decreasing control to the holding control and the decreasing inclination of the actual servo pressure is within the predetermined range inclination. According to this modification, the effects similar to the embodiments explained above can be achieved.

Further, the dead zone hydraulic pressure setting portion 173 is configured to judge whether or not the execution number of times of the target pressure change processing is less than a predetermined number of times. When the execution number of times is less than the predetermined number of times, the target pressure change processing is executed and when the execution number of times is equal to or more than the predetermined number of times, the target pressure change processing is not executed. The execution number of times can be reset when the actual servo pressure comes out of the dead zone or may be reset after completion of one brake operation. According to this structure, the influence on the actual servo pressure caused by the increase of the change amount and the number of processing times can be suppressed further.

Further, the target pressure change processing is not limited to the control that the target servo pressure marches the actual servo pressure but the control that the target servo pressure approximates the actual servo pressure may be acceptable. Further, the dead zone hydraulic pressure setting portion 173 may set a plurality of different change amounts in advance in response to the change inclination of the actual servo pressure such that the larger the change inclination of the actual servo pressure, the larger the change amount of the first or second hydraulic pressure becomes. The structure which generates the servo pressure (drive portion) is not limited to the structure (15) using the high pressure source and the electromagnetic valves, but the structure using the electric booster (for example, system which actuates the regulator by motor) can be applicable to the invention. Further, the structure of the spool valve of the regulator 15a may be the structure of ball valve. Thus, the invention is applicable to the system which may generate a response delay.

SUMMARY

The hydraulic pressure control device C according to the first embodiment can be described as follows. The hydraulic pressure control device C according to the first embodiment includes a valve portion 15 (150) which adjusts a fluid flowing into or flowing out of a hydraulic pressure chamber R5 (WC, 103) and a control portion 171 which sets a target pressure (target servo pressure) which is a target value of a hydraulic pressure in the hydraulic pressure chamber R5 and sets a dead zone which is a range of the hydraulic pressure between a first hydraulic pressure which is lower than the target pressure and a second hydraulic pressure which is higher than the target pressure, wherein the control portion 171 outputs a pressure increasing signal or a decreasing signal to the valve portion 15 to instruct execution of an inflow or outflow of the fluid with respect to the hydraulic pressure chamber R5, so that an actual pressure (actual servo pressure) which is an actual value of the hydraulic pressure in the hydraulic pressure chamber R5 approximates the target pressure when the actual pressure is located outside the dead zone and outputs a holding signal to the valve portion 15 to hold the actual pressure when the actual pressure is located within the dead zone and wherein the valve portion 15 is configured to allow a fluctuation of the actual pressure generated upon execution of the inflow or outflow of the fluid with respect to the hydraulic pressure chamber R5 for a predetermined time period in response to the pressure increasing signal or the decreasing signal which had been inputted immediately before an inputting of the holding signal, even after the holding signal was inputted. The hydraulic pressure control device C further includes a state judging portion 172 which judges whether or not a state of the hydraulic pressure chamber R5 is in a first state in which the actual pressure is increasing even the holding signal has been inputted to the valve portion 15 and a dead zone hydraulic pressure setting portion 173 which sets a second hydraulic pressure higher than the second hydraulic pressure when the state judging portion 172 judges that the state of the hydraulic pressure chamber R5 is in a second state that is not in the first state, when the state judging portion 172 judges that the state of the hydraulic pressure chamber R5 is in the first state.

It is preferable that the dead zone hydraulic pressure setting portion 173 sets the second hydraulic pressure in response to Increase width of the actual pressure per unit time in the first state.

Further, in the first embodiment, the second hydraulic pressure is set to a pressure higher than the target pressure by a predetermined value and the dead zone hydraulic pressure setting portion 173 executes a target pressure change processing to approximate the target pressure to the actual pressure, when the actual pressure is higher than the target pressure in the first state in order to set a pressure higher than the second hydraulic pressure in the second state, as the second hydraulic pressure (corrected second hydraulic pressure), in the first state.

The hydraulic pressure control device C according to the first embodiment further includes a state judging portion 172 which judges whether or not the state of the hydraulic pressure chamber R5 is in a third state in which the actual pressure is decreasing even the holding signal has been inputted to the valve portion 15 and a dead zone hydraulic pressure setting portion 173 which sets a first hydraulic pressure lower than the first hydraulic pressure when the state judging portion 172 judges that the state of the hydraulic pressure chamber R5 is in a second state that is not in the third state, when the state judging portion 172 judges that the state of the hydraulic pressure chamber R5 is in the third state.

Further, in the first embodiment, the first hydraulic pressure is set to a pressure lower than the target pressure by a predetermined value and the dead zone hydraulic pressure setting portion 173 executes a target pressure change processing to approximate the target pressure to the actual pressure, when the actual pressure is lower than the target pressure in the third state in order to set a pressure lower than the first hydraulic pressure in the second state, as the first hydraulic pressure (corrected first hydraulic pressure) in the third state.

It is preferable that the dead zone hydraulic pressure setting portion 173 executes a next target pressure change processing after a predetermined time period passed from the execution of the previous target pressure change processing, when the target pressure change processing is repeatedly executed.

It is preferable that the dead zone hydraulic pressure setting portion 173 executes the target pressure change processing of this time when a total amount of the change amount of the target pressure by the execution of the target pressure change processing is equal to or less than a predetermined defined amount, when the target pressure change processing is repeatedly executed.

As explained, the hydraulic pressure control device C according to the embodiments includes a state judging portion 172 which judges whether or not the actual pressure is in a fluctuated state even the holding signal has been inputted to the valve portion 15b6, 15b7 and a control portion 171 which executes a specific control which keeps the actual pressure to a hydraulic pressure within the dead zone when the state judging portion 172 judges that the state of the hydraulic pressure chamber R5 is "in a state that the actual pressure fluctuates even the holding signal has been inputted to the valve portion 15b6, 15b7".

REFERENCE SIGNS LIST

11; brake pedal, 12: master cylinder, 13; stroke simulator portion, 14; reservoir, 15; booster mechanism (valve portion), 150; valve portion, 15a; regulator (valve portion), 15b; pressure supply device, 15b1; reservoir, 15b2; accumulator, 15b6; pressure decreasing valve (valve portion), 15b7; pressure increasing valve (valve portion), 100r; pressure decreasing valve, 100a; pressure increasing valve, 16; actuator, 17; brake ECU (control portion), 171; control portion, 172; state judging portion, 173; dead zone hydraulic pressure setting portion, 174; total amount calculating portion, 175: leakage judging portion, "A"; hydraulic pressure braking force generating device, C; hydraulic pressure control device, WC; wheel cylinder.

The invention claimed is:

1. A hydraulic pressure control device comprising
a valve portion which adjusts a fluid flowing into or flowing out of a hydraulic pressure chamber, wherein
a target pressure which is a target value of a hydraulic pressure in the hydraulic pressure chamber is set and a dead zone which is a range of the hydraulic pressure between a first hydraulic pressure which is lower than the target pressure and a second hydraulic pressure which is higher than the target pressure is set, wherein
a pressure increasing signal or a decreasing signal is outputted to the valve portion to instruct execution of an inflow or an outflow of the fluid with respect to the hydraulic pressure chamber, so that an actual pressure which is an actual value of the hydraulic pressure in the hydraulic pressure chamber approximates the target pressure when the actual pressure is located outside the dead zone and a holding signal is outputted to the valve portion to hold the actual pressure when the actual pressure is located within the dead zone, wherein
the valve portion is configured to allow a fluctuation of the actual pressure generated upon execution of the inflow or the outflow of the fluid with respect to the hydraulic pressure chamber for a predetermined time period in response to the pressure increasing signal or the decreasing signal which had been inputted immediately before an inputting of the holding signal, even after the holding signal was inputted, and wherein the hydraulic pressure control device further comprising:
a state judging portion which judges whether or not a state of the hydraulic pressure chamber is in a state in which the actual pressure fluctuates even the holding signal has been inputted to the valve portion; and
a control portion which executes a specific control which keeps the actual pressure to a hydraulic pressure within the dead zone when the state judging portion judges that the state of the hydraulic pressure chamber is in a state that the actual pressure fluctuates even the holding signal has been inputted to the valve portion.

2. The hydraulic pressure control device according to claim 1, wherein, the state judging portion judges whether or not the state of the hydraulic pressure is in a first state in which the actual pressure is increasing even the holding signal has been inputted to the valve portion, and wherein the control portion includes a dead zone hydraulic pressure setting portion which sets a second hydraulic pressure higher than the second hydraulic pressure when the state judging portion judges that the state of the hydraulic pressure chamber is in a second state that is not in the first state, as a specific control, when the state judging portion judges that the state of the hydraulic pressure chamber is in the first state.

3. The hydraulic pressure control device according to claim 2, wherein the dead zone hydraulic pressure setting portion sets the second hydraulic pressure in response to an increasing width per unit time of the actual pressure in the first state.

4. The hydraulic pressure control device according to claim 2, wherein the second hydraulic pressure is set to a pressure higher than the target pressure by a predetermined value; and
the dead zone hydraulic pressure setting portion executes a target pressure change processing to approximate the target pressure to the actual pressure, when the actual pressure is higher than the target pressure in the first state, in order to set a pressure higher than the second hydraulic pressure in the second state, as the second hydraulic pressure in the first state.

5. The hydraulic pressure control device according to claim 1, wherein
the state judging portion judges whether or not the state of the hydraulic pressure chamber is in a third state in which the actual pressure is decreasing even the holding signal has been inputted to the valve portion; and wherein
the control portion includes a dead zone hydraulic pressure setting portion which sets a first hydraulic pressure lower than the first hydraulic pressure when the state judging portion judges that the state of the hydraulic pressure chamber is in a second state that is not in the third state, as a specific control, when the state judging portion judges that the state of the hydraulic pressure chamber is in the third state.

6. The hydraulic pressure control device according to claim 5, wherein the dead zone hydraulic pressure setting portion sets the first hydraulic pressure in response to a decreasing width per unit time of the actual pressure in the third state.

7. The hydraulic pressure control device according to claim 5, wherein the first hydraulic pressure is set to a pressure lower than the target pressure by a predetermined value; and wherein the dead zone hydraulic pressure setting portion executes a target pressure change processing to approximate the target pressure to the actual pressure, when the actual pressure is lower than the target pressure in the third state, in order to set a pressure lower than the first hydraulic pressure in the second state, as the first hydraulic pressure in the third state.

8. The hydraulic pressure control device according to claim 4, wherein the dead zone hydraulic pressure setting portion executes a next target pressure change processing after a predetermined time period passed from an execution of a previous target pressure change processing, when the target pressure change processing is repeatedly executed.

9. The hydraulic pressure control device according to claim 4, wherein the dead zone hydraulic pressure setting portion executes the target pressure change processing of this time when a total amount of the change amount of the target pressure by the execution of the target pressure change processing up to the previous time is equal to or less than a predetermined defined amount, when the target pressure change processing is repeatedly executed.

10. The hydraulic pressure control device according to claim 1, wherein the state judging portion judges whether or not the state of the hydraulic pressure chamber is in a first state in which the actual pressure is increasing even the holding signal has been inputted to the valve portion; and the control portion, as the specific control, outputs the pressure decreasing signal to the valve portion to let the fluid in the hydraulic pressure chamber flow out when the state judging portion judges that the state of the hydraulic pressure chamber is in the first state.

11. The hydraulic pressure control device according to claim 10, wherein the control portion stops the specific control when a value associated with a change amount of the actual pressure towards a pressure decreasing side becomes equal to or more than a predetermined value during the execution of the specific control.

12. The hydraulic pressure control device according to claim 10, wherein the control portion includes at least one threshold value in the dead zone with respect to the actual pressure and every time the actual pressure exceeds the threshold value, the control portion changes a control current which corresponds to the pressure decreasing signal to the valve portion outputted in the specific control towards an increasing side of a flowing out amount of the fluid in the hydraulic pressure chamber.

13. The hydraulic pressure control device according to claim 1, wherein the state judging portion judges whether or not the state of the hydraulic pressure chamber is in a third state in which the actual pressure is decreasing even the holding signal has been inputted to the valve portion, and wherein the control portion, as the specific control, outputs the pressure increasing signal to the valve portion to let the fluid flow into the hydraulic pressure chamber when the state judging portion judges that the state of the hydraulic pressure chamber is in the third state.

14. The hydraulic pressure control device according to claim 13, wherein the control portion stops the specific control when a value associated with a change amount of the actual pressure towards a pressure increasing side becomes equal to or more than a predetermined value during the execution of the specific control.

15. The hydraulic pressure control device according to claim 13, wherein the control portion includes at least one threshold value in the dead zone with respect to the actual pressure and every time the actual pressure becomes lower than the threshold value, the control portion changes a control current which corresponds to the pressure increasing signal to the valve portion outputted in the specific control towards an increasing side of a flowing-in amount of the fluid into the hydraulic pressure chamber.

16. The hydraulic pressure control device according to claim 10, wherein the control portion executes the specific control of this time at least after a second predetermined time in which a reaction can be detectible in case the reaction appears in the actual pressure by the specific control from the execution of previous specific control, when a plurality of specific controls is executed.

* * * * *